(12) United States Patent
Nishio et al.

(10) Patent No.: US 10,254,509 B2
(45) Date of Patent: Apr. 9, 2019

(54) IMAGE PICKUP LENS

(71) Applicant: OLYMPUS CORPORATION, Tokyoy (JP)

(72) Inventors: Akinori Nishio, Tokyo (JP); Koji Nakagawa, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 83 days.

(21) Appl. No.: 14/930,851

(22) Filed: Nov. 3, 2015

(65) Prior Publication Data
US 2016/0170174 A1   Jun. 16, 2016

(30) Foreign Application Priority Data

Dec. 10, 2014   (JP) ................................. 2014-249796

(51) Int. Cl.
| G02B 7/38 | (2006.01) |
|---|---|
| G02B 27/00 | (2006.01) |
| G02B 9/64 | (2006.01) |
| G02B 13/02 | (2006.01) |

(52) U.S. Cl.
CPC ............... *G02B 7/38* (2013.01); *G02B 13/02* (2013.01); *G02B 27/0062* (2013.01)

(58) Field of Classification Search
CPC ...... G02B 7/38; G02B 27/00; G02B 27/0025; G02B 27/0062; G02B 9/64; G02B 9/912; G02B 13/02; G02B 13/24; G02B 13/18; G02B 13/0035; G02B 23/243; G02B 21/02; G02B 15/177

USPC ....... 359/754, 748, 716, 735, 661, 689, 784, 359/786, 788, 791

See application file for complete search history.

(56) References Cited

U.S. PATENT DOCUMENTS

| 5,835,286 A * | 11/1998 | Yamanashi | G02B 9/12 359/755 |
|---|---|---|---|
| 8,654,242 B2 | 2/2014 | Matsusaka et al. | |
| 8,842,380 B2 | 9/2014 | Sunaga | |
| 9,201,213 B2 | 12/2015 | Ono | |
| 2011/0273611 A1 | 11/2011 | Matsusaka et al. | |
| 2012/0314306 A1* | 12/2012 | Sunaga | G02B 13/04 359/784 |

(Continued)

FOREIGN PATENT DOCUMENTS

| JP | 2006-162688 A | 6/2006 |
|---|---|---|
| JP | 2012-255842 | 12/2012 |
| JP | 2014-035458 | 2/2014 |

(Continued)

OTHER PUBLICATIONS

Japanese Office Action dated May 23, 2018, issued in the basic Japanese Patent Application No. 2014-249796 (with English translation thereof).

*Primary Examiner* — Jie Lei
(74) *Attorney, Agent, or Firm* — Hunton Andrews Kurth LLP

(57) ABSTRACT

An image pickup lens includes in order from an object side, a front lens unit having a positive refractive power, one focusing lens unit having a positive refractive power, and a rear lens unit having a negative refractive power, wherein at the time of focusing, the focusing lens moves on an optical axis, and a single lens having a positive refractive power is disposed nearest to an object in the rear lens unit.

6 Claims, 16 Drawing Sheets

(56) References Cited

U.S. PATENT DOCUMENTS

2014/0347749 A1  11/2014  Ono

FOREIGN PATENT DOCUMENTS

| WO | WO 2011/027690 A1 | 3/2011 |
| WO | WO 2013/118468 A1 | 8/2013 |

* cited by examiner

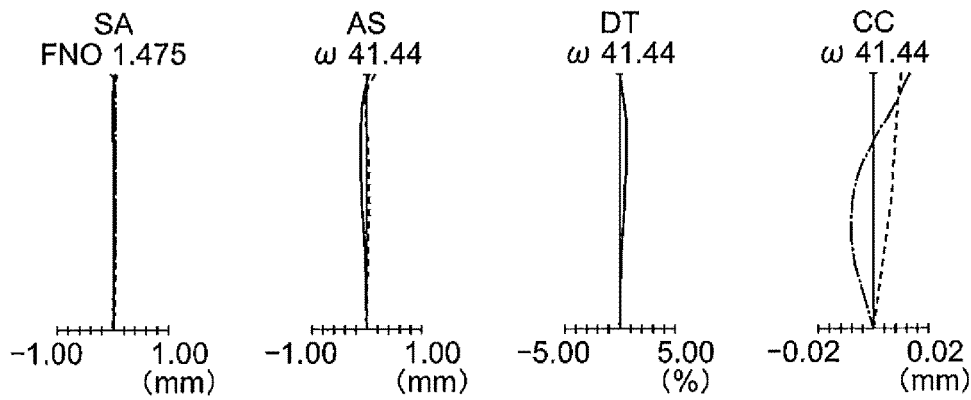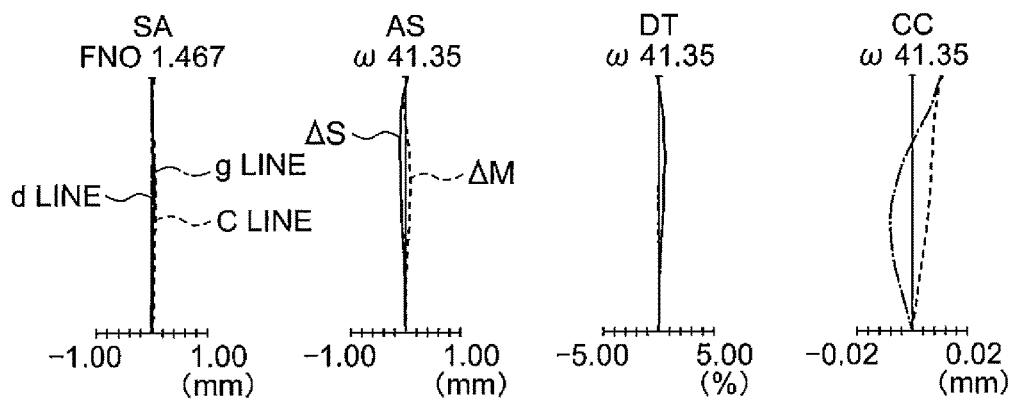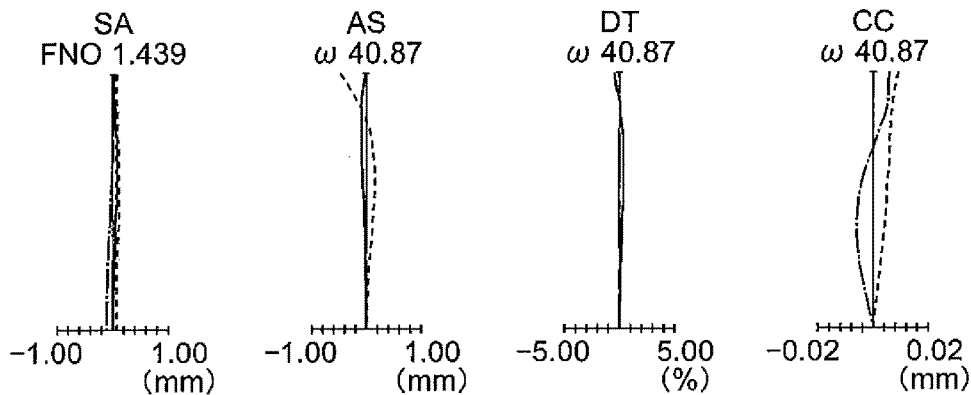

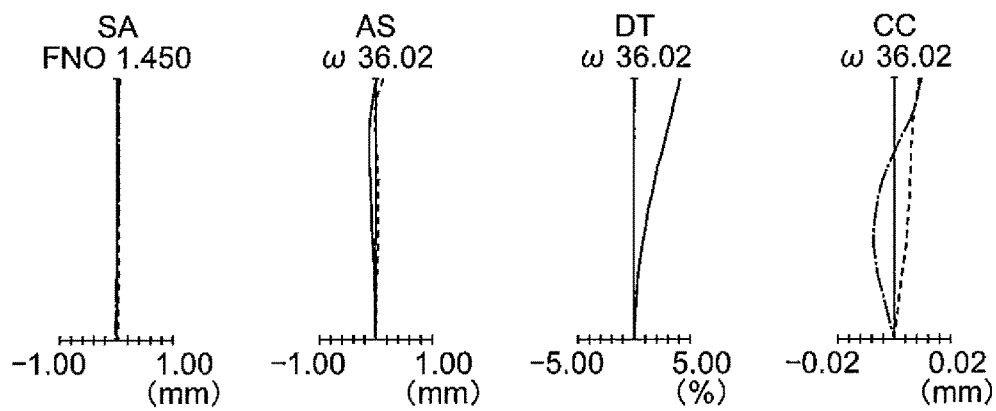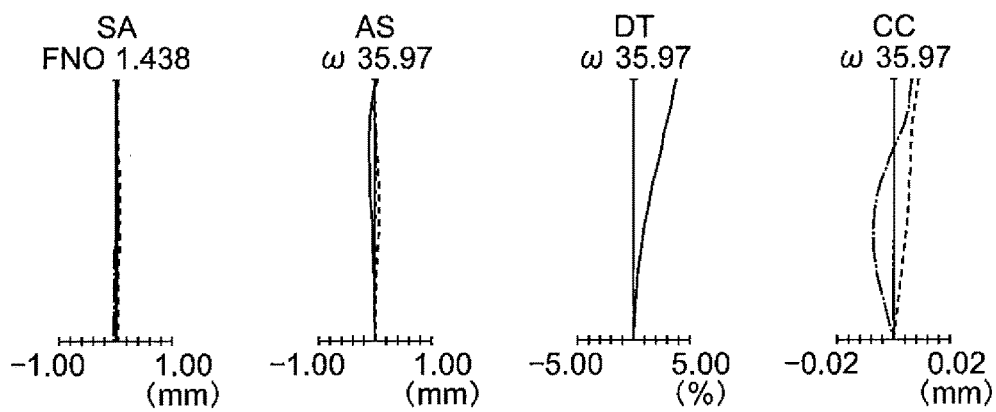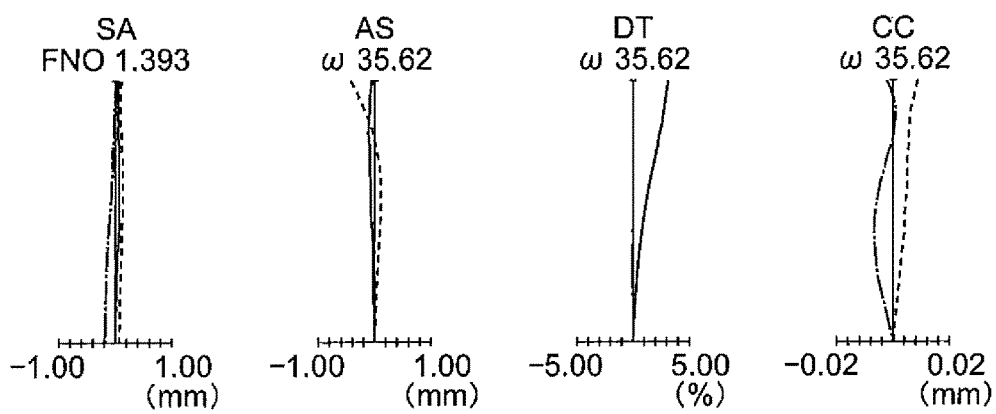

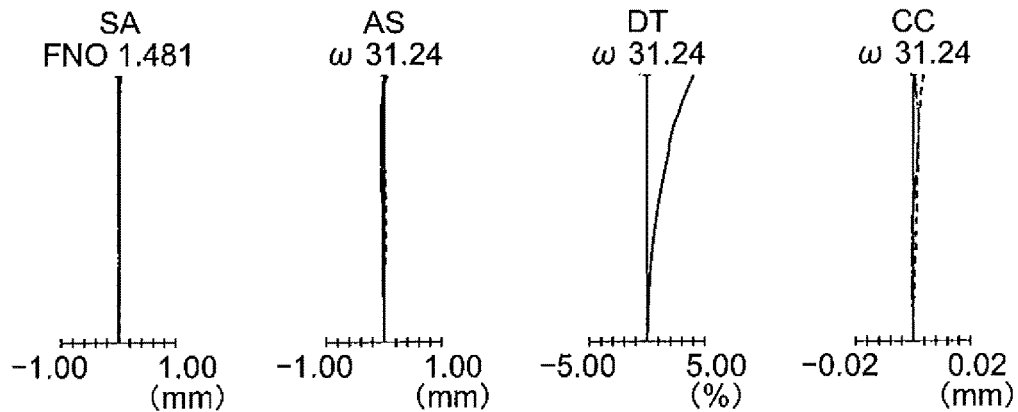
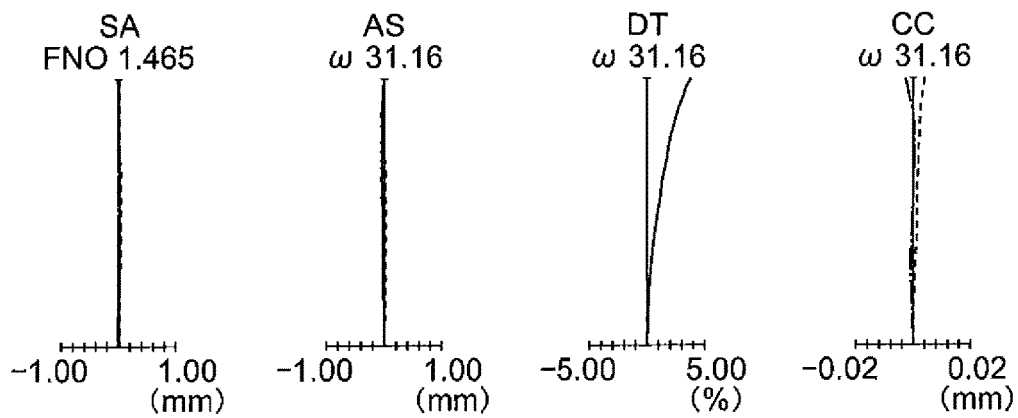
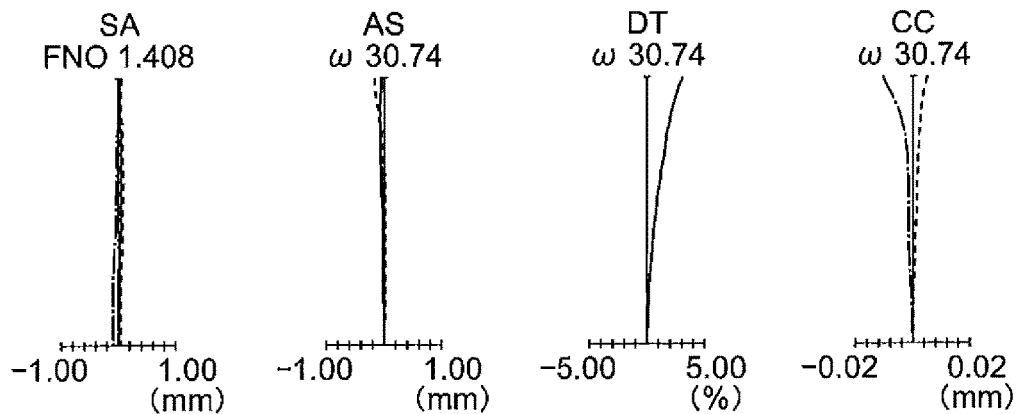

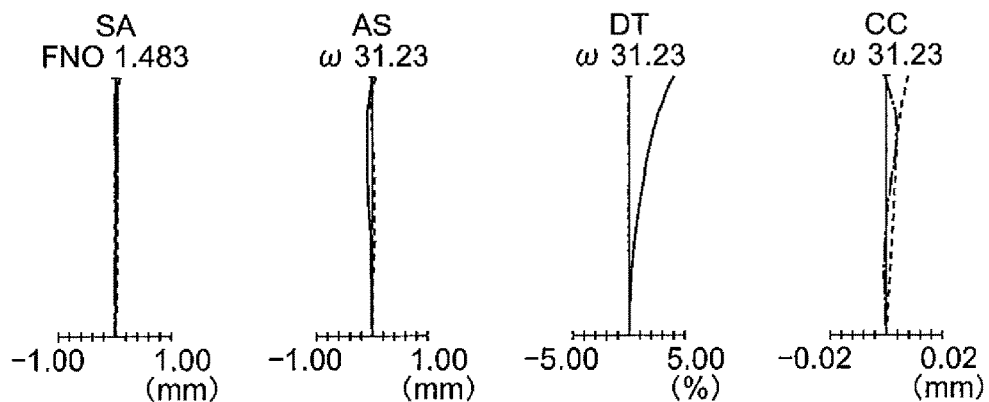
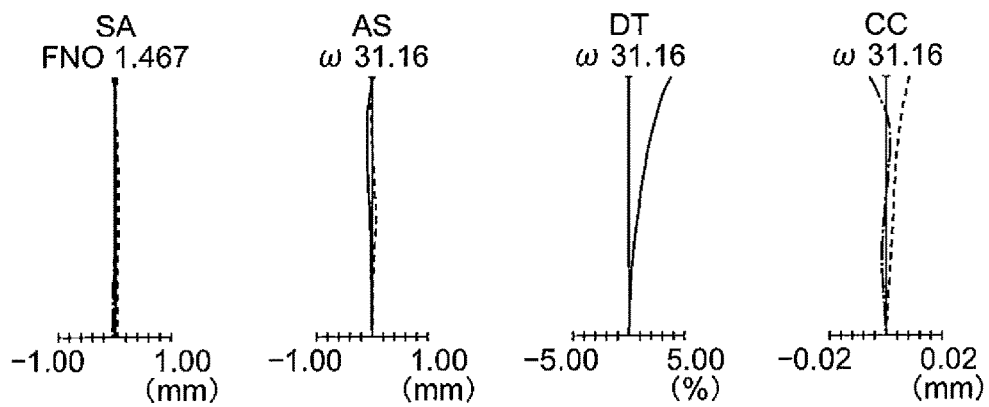
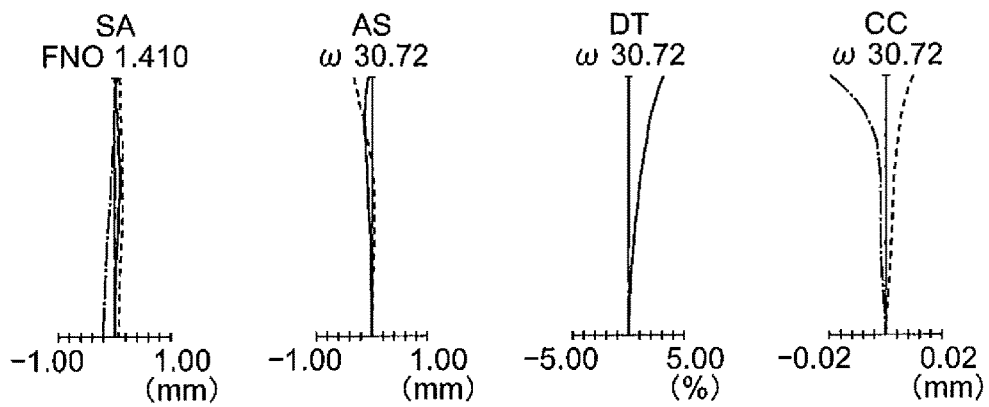

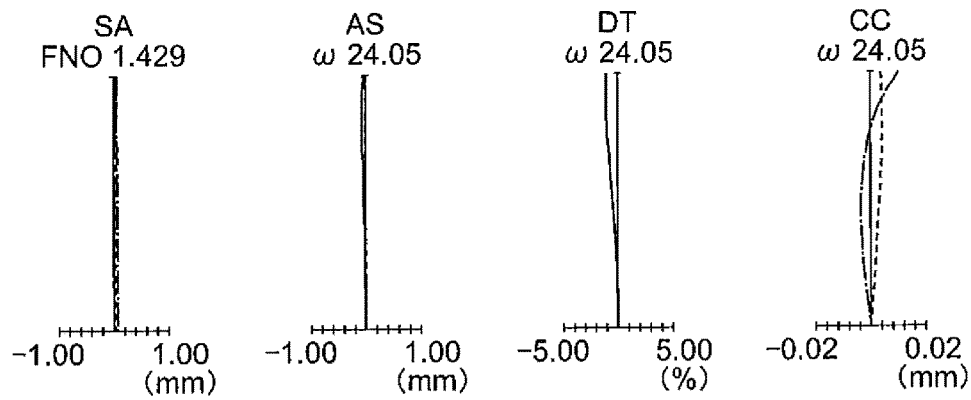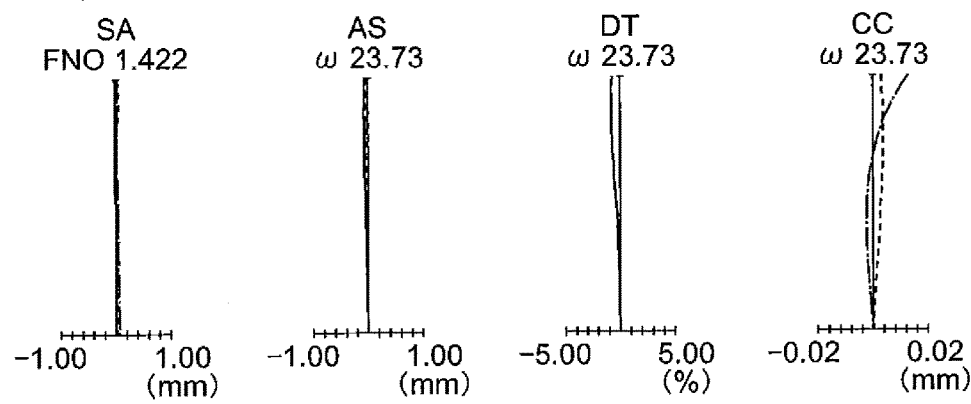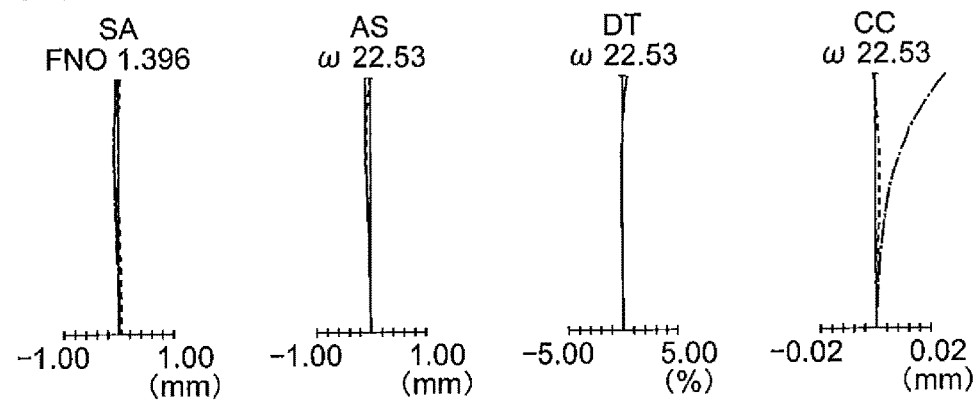

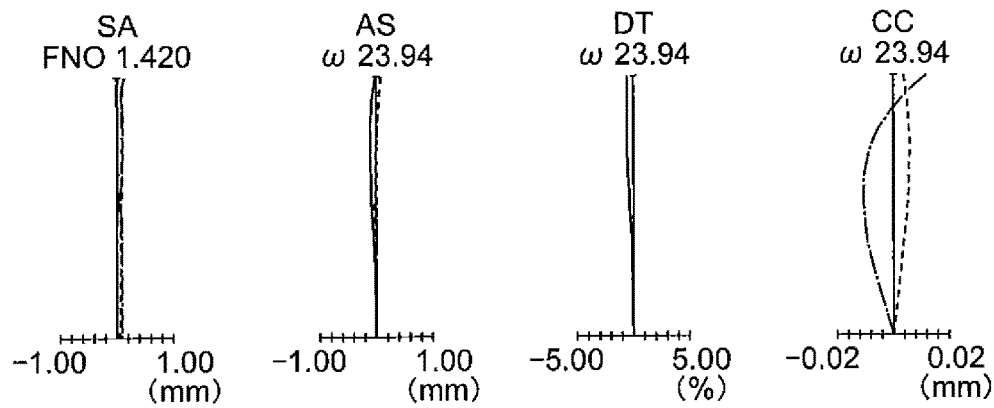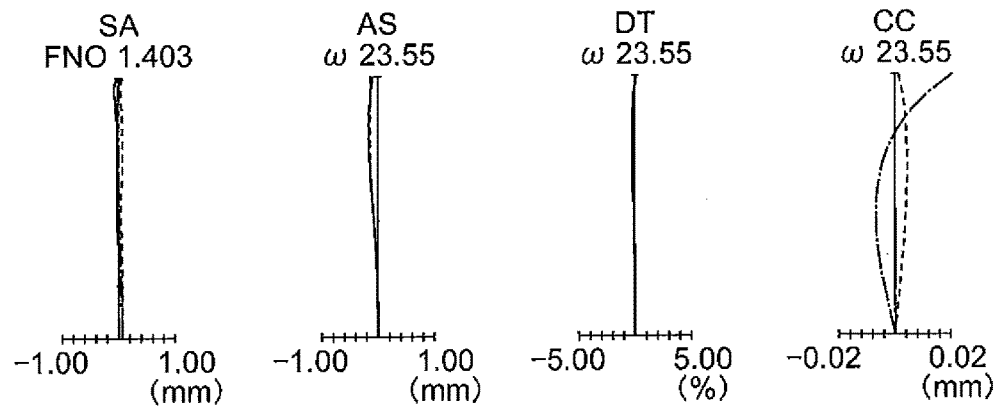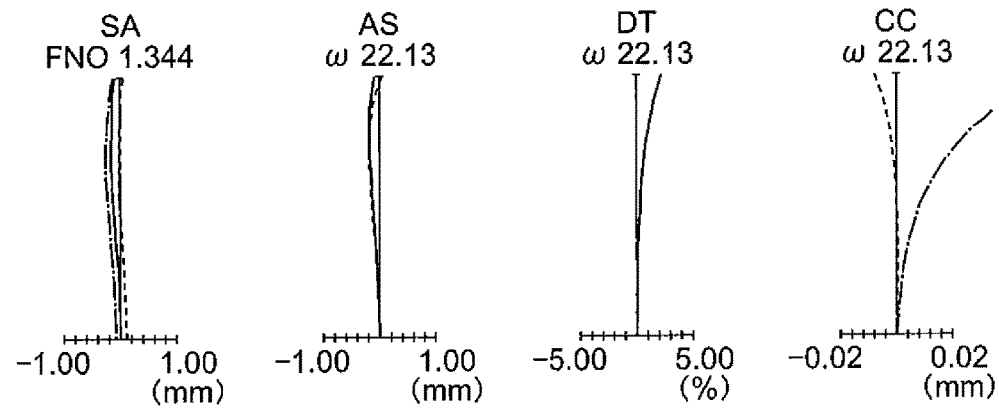

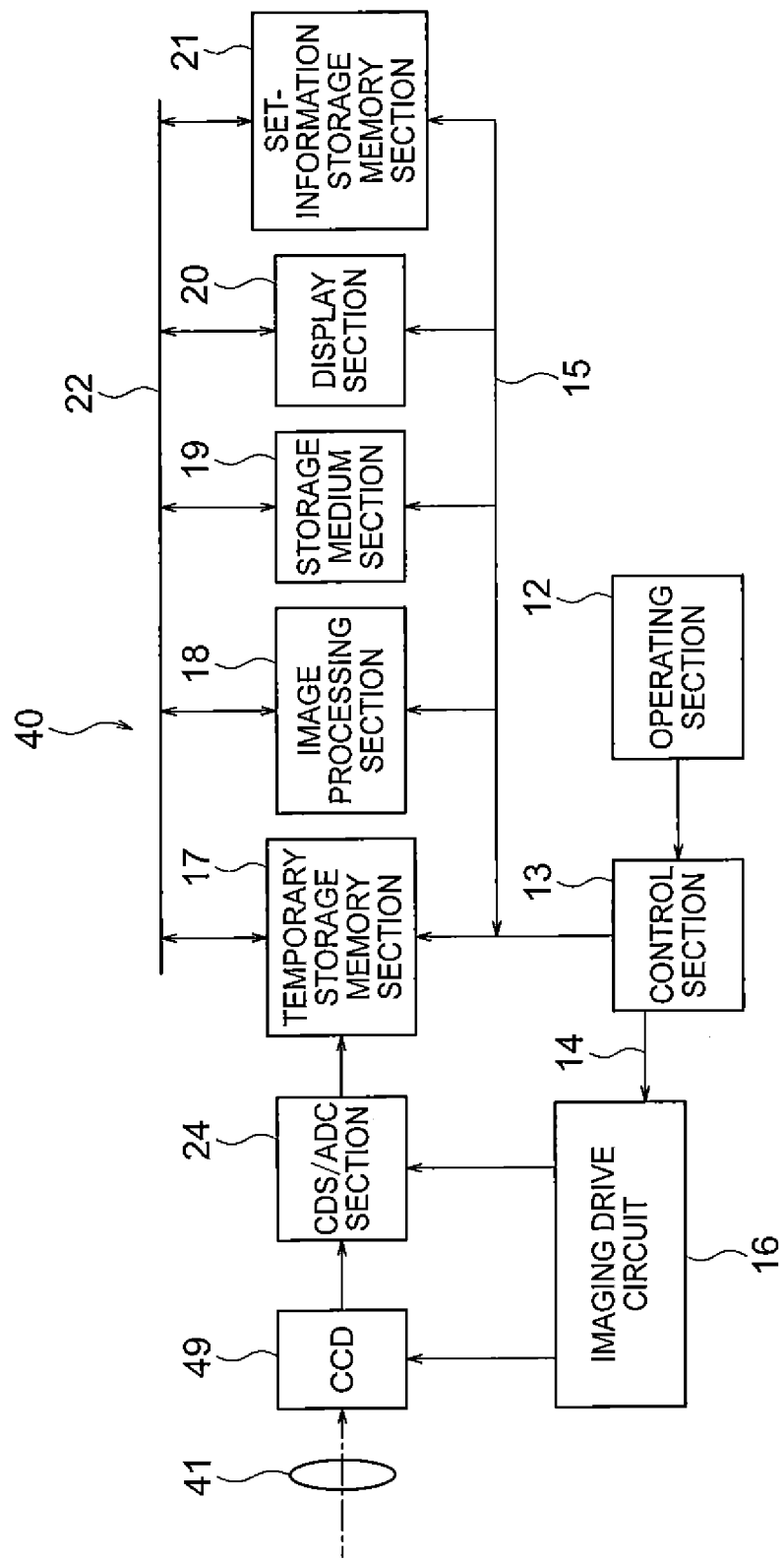

IMAGE PICKUP LENS

CROSS-REFERENCE TO RELATED APPLICATION

The present application is based upon and claims the benefit of priority from the prior Japanese Patent Application No. 2014-249796 filed on Dec. 10, 2014; the entire contents of which are incorporated herein by reference.

BACKGROUND OF THE INVENTION

Field of the Invention

The present invention relates to an image pickup lens, and in particular, to an image pickup lens of an interchangeable lens camera.

Description of the Related Art

As an interchangeable lens camera, a mirrorless single-lens camera has been known. In the mirrorless single-lens camera, there is no bending mirror as in a single-lens reflex camera. Therefore, it is possible to make the mirrorless single-lens camera to be a camera that is more compact as compared to the single-lens reflex camera. In recent years, the compactness of the mirrorless single-lens cameras has been gaining acceptance by users, and the market for such cameras has been expanding.

Even the mirrorless single-lens camera has been equipped with an AU (autofocus) function similarly as the single-lens reflex camera. As an AF type, a phase-difference AF and a contrast AF are available. In the single-lens reflex cameras, the phase-difference AF has been predominant.

On the other hand, among the mirrorless single-lens cameras, there are cameras in which the phase-difference AF cannot be used. In such mirrorless single-lens cameras, the contrast AF is to be used. In the contrast AF, the focusing is to be carried out by finding a location by scanning a focusing lens unit, where the contrast becomes the maximum.

A problem that arises in a case of using the contrast AF is a weight of the focusing lens unit. Here, an amount of movement of the focusing lens unit which is necessary till a focused state achieved is let to be a predetermined amount of movement. In a case of the phase-difference AF, it is possible to calculate the predetermined amount of movement at one time by using information from an AF sensor. Accordingly, it is possible to move the focusing lens unit in accordance with the predetermined amount of movement that has been calculated.

Whereas, in a case of the contrast AF, information obtained from the AF sensor is only a contrast value at that instant. In other words, the predetermined amount of movement cannot be determined at one time. Therefore, in the contrast AF, the contrast is calculated by moving the focusing lens unit, and the contrast calculated is compared with the contrast before moving. In such manner, while reading out a change in the contrast, the focusing operation is carried out by finding a location where the contrast becomes the maximum.

Here, for detecting the maximum value of contrast, it is to be made sure that the contrast after moving becomes smaller than the contrast before moving. Accordingly, in the contrast AF, it is necessary to move the focusing lens unit to a position farther than a position at which, the contrast became the maximum.

Consequently, when the predetermined amount of movement is compared for the contrast AF and the phase-difference AF, the predetermined amount of movement is overwhelmingly larger for the former. As described above, in an optical system in which, the contrast AF is used, light-weighting of the focusing lens unit becomes a vital point.

As an image pickup lens in which, the contrast AF is to be used, optical systems disclosed in Japanese Patent Application Laid-open Publication Nos. 2012-255842 and 2014-35458 are available.

SUMMARY OF THE INVENTION

An image pickup lens of the present invention includes in order from an object side,
a front lens unit having a positive refractive power,
one focusing lens having a positive refractive power, and
a rear lens unit having a negative refractive power, and
at the time of focusing, the focusing lens moves on an optical axis, and
a single lens having a positive refractive power is disposed nearest to an object in the rear lens unit.

BRIEF DESCRIPTION OF THE DRAWINGS

FIG. 1A is a lens cross-sectional view at the time of focusing to an object at infinity, FIG. 1B is a lens cross-sectional view when the magnification is 0.03 times, and FIG. 1C is a lens cross-sectional view at the time of focusing to a closest object;

FIG. 2A is a lens cross-sectional view at the time of focusing to an object at infinity, FIG. 2B is a lens cross-sectional view when the magnification is 0.03 times, and FIG. 2C is a lens cross-sectional view at the time of focusing to a closest object;

FIG. 3A is a lens cross-sectional view at the time of focusing to an object at infinity, FIG. 3B is a lens cross-sectional view when the magnification is 0.03 times, and FIG. 3C is a lens cross-sectional view at the time focusing to a closest object;

FIG. 4A is a lens cross-sectional view at the time of focusing to an object at infinity, FIG. 4B is a lens cross-sectional view when the magnification is 0.03 times, and FIG. 4C is a lens cross-sectional view at the time of focusing to a closest object;

FIG. 5A is a lens cross-sectional view at the time of focusing to an object at infinity, FIG. 5B is a lens cross-sectional view when the magnification is 0.03 times, and FIG. 5C is a lens cross-sectional view at the time of focusing to a closest object;

FIG. 6A is a lens cross-sectional view at the time of focusing to an object at infinity, FIG. 6B is a lens cross-sectional view when the magnification is 0.03 times, and FIG. 6C is a lens cross-sectional view at the time of focusing to a closest object;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L (hereinafter, FIG. 7A to FIG. 7L) are aberration diagrams of the image pickup lens according to the example 1, where, FIG. 7A, FIG. 7E, and FIG. 7I show a spherical aberration (SA), FIG. 7B, FIG. 7F, and FIG. 7J show an astigmatism (AS), FIG. 7C, FIG. 7G, and FIG. 7K show a distortion (DT), and FIG. 7D, FIG. 7H, and FIG. 7L show a chromatic aberration of magnification (CC), and moreover, FIG. 7A, FIG. 7B, FIG. 7C, and FIG. 7D show aberration diagrams at the time of focusing to an object at infinity, FIG. 7E, FIG. 7F, FIG. 7G, and FIG. 7H show aberration diagrams when the magnification is 0.03 times, and FIG. 7I, FIG. 7J, FIG. 7K, and FIG. 7L show aberration diagrams at the time of focusing to a closest object;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, FIG. 8A to FIG. 8L) are aberration diagrams of the image pickup lens according to the example 2, where, FIG. 8A, FIG. 8E, and FIG. 8I show a spherical aberration (SA), FIG. 8B, FIG. 8F, and FIG. 8J show an astigmatism (AS), FIG. 8C, FIG. 8G, and FIG. 8K show a distortion (DT), and FIG. 8D, FIG. 8H, and FIG. 8L show a chromatic aberration of magnification (CC), and moreover, FIG. 8A, FIG. 8B, FIG. 8C, and FIG. 8D show aberration diagrams at the time of focusing to an object at infinity, FIG. 8E, FIG. 8F, FIG. 8G, and FIG. 8H show aberration diagrams when the magnification is 0.03 times, and FIG. 8I, FIG. 8J, FIG. 8K, and FIG. 8L show aberration diagrams at the time of focusing to a closest object;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L (hereinafter, FIG. 9A to FIG. 9L) are aberration diagrams of the image pickup lens according to the example 3, where, FIG. 9A, FIG. 9E, and FIG. 9I show a spherical aberration (SA), FIG. 9B, FIG. 9F, and FIG. 9J show an astigmatism (AS), FIG. 9C, FIG. 9G, and FIG. 9K show a distortion (DT), and FIG. 9D, FIG. 9H, and FIG. 9L show a chromatic aberration of magnification (CC), and moreover, FIG. 9A, FIG. 9B, FIG. 9C, and FIG. 9D show aberration diagrams at the time of focusing to an object at infinity, FIG. 9E, FIG. 9F, FIG. 9G, and FIG. 9H show aberration diagrams when the magnification is 0.03 times, and FIG. 9I, FIG. 9J, FIG. 9K, and FIG. 9L show aberration diagrams at the time of focusing to a closest object;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, FIG. 10A to FIG. 10L) are aberration diagrams of the image pickup lens according to the example 4, where, FIG. 10A, FIG. 10E, and FIG. 10I show a spherical aberration (SA), FIG. 10B, FIG. 10F, and FIG. 10J show an astigmatism (AS), FIG. 10C, FIG. 10G, and FIG. 10K show a distortion (DT), and FIG. 10D, FIG. 10H, and FIG. 10L show a chromatic aberration of magnification (CC), and moreover, FIG. 10A, FIG. 10B, FIG. 10C, and FIG. 10D show aberration diagrams at the time of focusing to an object at infinity, FIG. 10E, FIG. 10F, FIG. 10G, and FIG. 10H show aberration diagrams when the magnification is 0.03 times, and FIG. 10I, FIG. 10J, FIG. 10K, and FIG. 10L show aberration diagrams at the time of focusing to a closest object;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L (hereinafter, FIG. 11A to FIG. 11L) are aberration diagrams of the image pickup lens according to the example 5, where, FIG. 11A, FIG. 11E, and FIG. 11I show a spherical aberration (SA), FIG. 11B, FIG. 11F, and FIG. 11J show an astigmatism (AS), FIG. 11C, FIG. 11G, and FIG. 11K show a distortion (DT), and FIG. 11D, FIG. 11H, and FIG. 11L show a chromatic aberration of magnification (CC), and moreover, FIG. 11A, FIG. 11B, FIG. 11C, and FIG. 11D show aberration diagrams at the time of focusing to an object at infinity, FIG. 11E, FIG. 11F, FIG. 11G, and FIG. 11H show aberration diagrams when the magnification is 0.03 times, and FIG. 11I, FIG. 11J, FIG. 11K, and FIG. 11L show aberration diagrams at the time of focusing to a closest object;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, FIG. 12A to FIG. 12L) are aberration diagrams of the image pickup lens according to the example 6, where, FIG. 12A, FIG. 12E, and FIG. 12I show a spherical aberration (SA), FIG. 12B, FIG. 12F, and FIG. 12J show an astigmatism (AS), FIG. 12C, FIG. 12G, and FIG. 12K show a distortion (DT), and FIG. 12D, FIG. 12H, and FIG. 12L show a chromatic aberration of magnification (CC), and moreover, FIG. 12A, FIG. 12B, FIG. 12C, and FIG. 12D show aberration diagrams at the time of focusing to an object at infinity, FIG. 12E, FIG. 12F, FIG. 12G, and FIG. 12H show aberration diagrams when the magnification is 0.03 times, and FIG. 12I, FIG. 12J, FIG. 12K, and FIG. 12L show aberration diagrams at the time of focusing to a closest object;

FIG. 16 is a structural block diagram of an internal circuit of main components of the image pickup apparatus.

DETAILED DESCRIPTION OF THE INVENTION

Figure 1A:
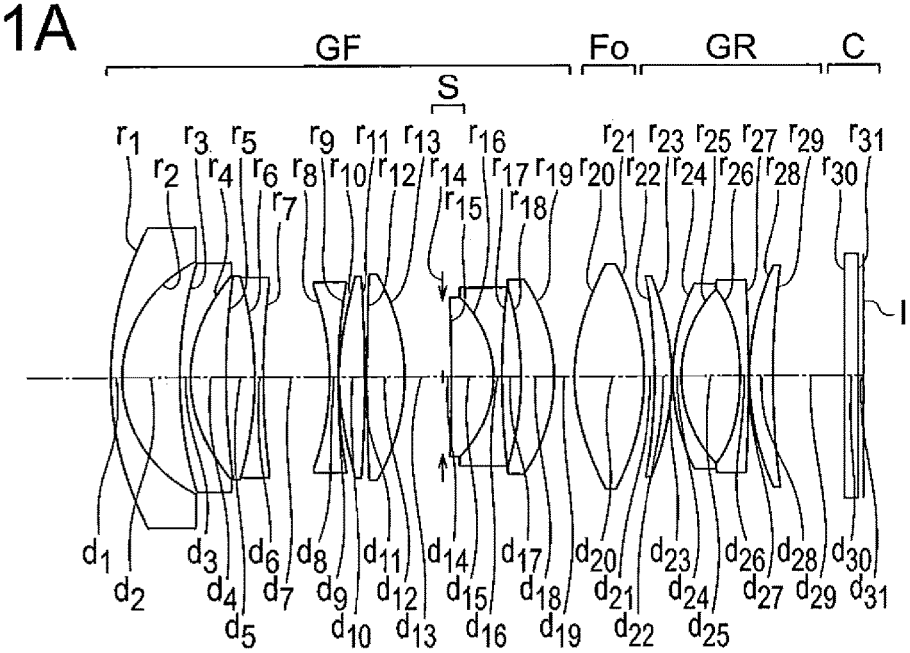
FIG. 1A, FIG. 1B, and FIG. 1C are lens cross-sectional views of an image pickup lens according to an example 1 of the present invention, where.

Prior to explaining examples, an action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations in these aspects. Therefore, the present invention is not restricted to the aspects that are exemplified.

An image pickup lens according to the present embodiment includes in order from an object side, a front lens unit having a positive refractive power, one focusing lens having a positive refractive power, and a rear lens unit having a negative refractive power, and at the time of focusing, the focusing lens moves on an optical axis, and a single lens having a positive refractive power is disposed nearest to an object in the rear lens unit.

A reason for making such arrangement, and an effect thereof, will be described below. In the present embodiment, the image pickup lens includes in order from the object side, the front lens unit having a positive refractive power, one focusing lens having a positive refractive power, and the rear lens unit having a negative refractive power. Moreover, in the image pickup lens of the present embodiment, an arrangement in which, the focusing lens moves on the optical axis at the time of focusing has been adopted.

Firstly, by letting the focusing lens to be one lens, it is possible to make a lens that moves at the time of focusing light-weight. Besides, the lens to be moved being one lens, it is possible to simplify a driving mechanism for moving the focusing lens. Accordingly, manufacturing of the driving mechanism becomes easy. As a result, it is possible to achieve a contrast AF with a high speed and high accuracy.

In a large-aperture lens, for correcting a spherical aberration and a coma aberration favorably, at a location where a height of an axial light ray is high, it is important to impart the highest possible degree of freedom to aberration correction (hereinafter, called as 'degree of freedom of correction'). Here, the degree of freedom of correction means for example, a radius of curvature of a lens surface, a distance between lens surfaces, a refractive index, and Abbe's number.

In the image pickup lens of the present embodiment, an arrangement is such that a height of an axial light ray of a light beam that is incident on the rear lens unit is maintained to be as high as possible. Therefore, it is possible to use thoroughly the overall degree of freedom of correction from the front lens unit up to the rear lens unit for the correction of the spherical aberration and the coma aberration.

Furthermore, in the image pickup lens of the present embodiment, the single lens having a positive refractive power is disposed nearest to the object in the rear lens unit. Accordingly, it is possible to correct a Petzval aberration and the coma aberration, thereby making it possible to realize an image pickup lens having a favorable imaging performance.

It is preferable that the image pickup lens of the present embodiment satisfies the following conditional expression (1).

$$1.0 < f_f/f_{fo} \quad (1)$$

where, $f_f$ denotes a focal length of the front lens unit, and $f_{fo}$ denotes a focal length of the focusing lens.

Conditional expression (1) is a regulation with respect to the refractive power of the front lens unit, and is a conditional expression in which, the focal length of the front lens unit has been standardized by the focal length of the focusing lens.

When a value falls below a lower limit value of conditional expression (1), the positive refractive power of the front lens unit becomes excessively strong. Therefore, since a radius of curvature of each lens in the front lens unit becomes small, aberrations occurring in the front lens unit, particularly, the spherical aberration and the coma aberration are degraded. Accordingly, since correction of these aberrations becomes difficult, it is not preferable.

Moreover, it is preferable that the image pickup lens of the present embodiment satisfies the following conditional expression (2).

$$1.0 < f_{r1}/f_{fo} \quad (2)$$

where, $f_{r1}$ denotes a focal length of the single lens having a positive refractive power which is disposed nearest to an object in the rear lens unit, and $f_{fo}$ denotes a focal length of the focusing lens.

Conditional expression (2) is a regulation related to the refractive power of the single lens having a positive refractive power which is disposed nearest to the object in particular, in the rear lens unit, and is a conditional expression in which, the focal length of the single lens having a positive refractive power disposed nearest to the object in the rear lens unit has been standardized by the focal length of the focusing lens.

When a value falls below a lower limit value of conditional expression (2), the negative refractive power of the rear lens unit becomes excessively weak. Therefore, aberrations occurring in the rear lens unit, particularly, the coma aberration and the Petzval aberration, become large. Accordingly, since correction of aberration becomes difficult, it is not preferable.

Moreover, it is preferable that the image pickup lens of the present embodiment satisfies the following conditional expression (3).

$$0.5 < (1 - mg_{Fo}^2) \times (mg_R)^2 \quad (3)$$

where, $mg_{Fo}$ denotes a lateral magnification of the focusing lens, and $mg_R$ denotes a lateral magnification of the rear lens unit.

Conditional expression (3) is a regulation related to a focusing sensitivity of the focusing lens. Each of the lateral magnification of the focusing lens and the lateral magnification of the rear lens unit is a lateral magnification when focused to an object at infinity.

When a value falls below a lower limit value of conditional expression (3), the focusing sensitivity of the focusing lens becomes excessively low. In such case, at the time of focusing, an amount of movement of the focusing lens increases. Therefore, it is not desirable that the value falls below the lower limit value of conditional expression (3).

Moreover, it is preferable that the image pickup lens of the present embodiment satisfies the following conditional expression (4).

$$vd_{Fo} \geq 40.0 \quad (4)$$

where, $vd_{Fo}$ denotes Abbe's number for the focusing lens.

Conditional expression (4) is a regulation related to Abbe's number for the focusing lens.

When a value falls below a lower limit value of conditional expression (4), a fluctuation in the chromatic aberration at the time of focusing becomes large. Accordingly, since correction of the chromatic aberration of magnification becomes difficult, it is not preferable.

Moreover, it is preferable that the image pickup lens of the present embodiment satisfies the following conditional expression (5).

$$(r_{Rfof} + r_{Rfor})/(r_{Rfof} - r_{Rfor}) < 0.0 \quad (5)$$

where, $r_{Rfof}$ denotes a radius of curvature of an object-side surface of the focusing lens, and $r_{Rfor}$ denotes a radius of curvature of an image-side surface of the focusing lens.

Conditional expression (5) is a regulation related to a shape factor of the focusing lens. When a value exceeds an upper limit value of conditional expression (5), An amount of spherical aberration occurred in the entire optical system becomes large. Accordingly, since an aberration performance of the optical system is degraded, it is not preferable.

Moreover, it is preferable that the image pickup lens of the present embodiment satisfied the following conditional expression (6).

$$0.0 < Fno/(f \times 21.633/Y) < 0.08 \quad (6)$$

where, f denotes a focal length of the overall lens system,

Fno denotes an F-number of the lens system, and

Y denotes a maximum image height on an image forming surface of the lens.

Conditional expression (6) is a conditional expression in which, a ratio of the F-number of the image pickup lens and the focal length of the overall image pickup lens system has been regulated. The focal length of the overall image pickup lens system is standardized by the image height Y on the image forming surface of the optical system. Each of the focal length and the F-number are focal length and F-number when focused to an object at infinity.

When a value falls below a lower limit value of conditional expression (6), since the F-number becomes excessively small, occurrence of the spherical aberration becomes large. When an upper limit value of conditional expression (6) is exceeded, since the F-number becomes excessively large, the image pickup lens ceases to be a fast lens. Or, since the focal length of the overall image pickup lens system becomes large, the optical system as a whole cannot be arranged compactly.

Moreover, it is preferable to satisfy mutually the plurality of abovementioned arrangements simultaneously. Moreover, some of the arrangements may be let to be satisfied simultaneously. For instance, an arrangement may be made such that in one of the abovementioned image pickup lenses, an arrangement of one of the other image pickup lenses described above is used.

Regarding the conditional expressions, an arrangement may be made such that the image pickup lens satisfies each conditional expression separately. When such an arrangement is made, it become easy to have the respective effect, and therefore, it is preferable.

Moreover, regarding each conditional expression, the lower limit value or the upper limit value may be changed as shown below. By doing so, since it is possible to make the effect of each conditional expression even more assured, it is preferable.

It is more preferable that the image pickup lens satisfies the following conditional expression (1)' instead of conditional expression (1).

$$1.4 < f_f/f_{fo} \qquad (1)'$$

It is more preferable that the image pickup lens satisfies the following conditional expression (2)' instead of conditional expression (2).

$$1.4 < f_{r1}/f_{fo} \qquad (2)'$$

It is more preferable that the image pickup lens satisfies the following conditional expression (3)' instead of conditional expression (3).

$$0.45 < (1-mg_{Fo}^2) \times (mg_R)^2 \qquad (3)'$$

It is more preferable that the image pickup lens satisfies the following conditional expression (4)' instead of conditional expression (4).

$$\nu d_{Fo} \geq 45 \qquad (4)'$$

It is more preferable that the image pickup lens satisfies the following conditional expression (5)' instead of conditional expression (5).

$$(r_{Rfof} + r_{Rfor})/(r_{Rfof} - r_{Rfor}) < -0.05 \qquad (5)'$$

It is more preferable that the image pickup lens satisfies the following conditional expression (6)' instead of conditional expression (6).

$$0.015 < Fno/(f \times 21.633/Y) < 0.075 \qquad (6)'$$

Examples of a zoom lens to be used in an image pickup apparatus according to the present invention will be described below in detail by referring to the accompanying diagrams. However, the present invention is not restricted to the examples described below.

Examples from an example 1 to an example 6 of the zoom lens will be described below. Lens cross-sectional views of the examples from the example 1 to the example 6 are shown in diagrams from FIG. 1A to FIG. 6C. FIG. 1A, FIG. 2A, FIG. 3A, FIG. 4A, FIG. 5A, and FIG. 6A are lens cross-sectional views at the time of focusing to an object at infinity, FIG. 1B, FIG. 2B, FIG. 3B, FIG. 4B, FIG. 5B, and FIG. 6B are lens cross-sectional views when the magnification is 0.03 times, and FIG. 1C, FIG. 2C, FIG. 3C, FIG. 4C, FIG. 5C, and FIG. 6C are lens cross-sectional views at the time of focusing to a closest object. The magnification is 0.03 times refers to a case when focused to an object distance at which the magnification becomes 0.03 times.

Moreover, the front lens unit is denoted by GF, the focusing lens is denoted by Fo, the rear lens unit is denoted by GR, the aperture stop is denoted by S, the cover glass is denoted by C, and the image plane (image pickup surface) is denoted by I.

Moreover, for shielding unnecessary light such as a ghost and a flare, a flare aperture may be disposed apart from the aperture stop. The flare aperture may be disposed at any location such as an object side of the front lens unit, between the front lens unit and the focusing lens, between the focusing lens and the rear lens unit, and between the rear lens unit and the image plane.

An arrangement may be made such that a frame member is used as a light shielding portion of the flare aperture, and flare light rays are shielded by the frame member, or the shielding portion may be formed by another member. Moreover, the shielding portion may be printed directly on an optical system, or may be painted. Furthermore, a seal etc. may be adhered as a light shielding portion to the optical system.

A shape of the light shielding portion may be any shape such as a circular shape, an elliptical shape, a rectangular shape, a polygon, and an area surrounded by a function curve. Moreover, not only harmful light beam, but also light beam such as a coma flare around a screen may be cut off.

The ghost and the flare may be reduced by applying an antireflection coating to each lens. A multi-coating is desirable, as the multi-coating is capable of reducing effectively the ghost and the flare. Moreover, an infra-red rays cutting coating may be applied to lens surfaces and cover glasses.

Applying the antireflection coating to a surface in contact with air of a lens to prevent the ghost and the flare has been a carried out generally. Meanwhile, a refractive index of an adhesive on a cemented surface of a cemented lens is sufficiently higher than a refractive index of air. Therefore, the refractive index of the cemented surface of the cemented lens is of a same level as of a single-layer coating, or a reflectivity is lower than that of the single-layer coating. Therefore, purposely, coating is hardly applied to the cemented surface of the cemented lens. However, since it is possible to reduce further the ghost and the flare when the antireflection coating is applied positively to the cemented surface, it is possible to achieve a favorable image.

Particularly, a glass with a high refractive index has been used widely nowadays. The glass with a high refractive index, being highly effective in aberration correction, has been used a lot in camera optical systems. However, when the glass with a high refractive index is used for a cemented lens, reflection at a cemented surface cannot be ignored. In such case, applying the antireflection coating to the cemented surface is particularly effective.

An effective usage of the cemented surface coating has been disclosed in Japanese Patent Application Laid-open Publication Nos. Hei 2-27301, 2001-324676, and 2005-92115, and US Patent Publication No. 7116482.

In the abovementioned patent documents, coating on a surface of a cemented lens in a first lens unit of a positivelead type zoom lens in particular has been mentioned. Therefore, it is preferable to apply the cemented-surface coating as disclosed in the abovementioned patent documents to a surface of a cemented lens in the front lens unit having a positive refractive power of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, ZnO, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

As a matter of course, similar to the coating on a surface of a lens in contact with air, the coating on a cemented surface may also be let to be a multi coating. By combining appropriately a film thickness and a coating material of number of films not less than in two layers, it is possible to reduce further the reflectance, and to control spectral characteristics and angular characteristics of reflectance. Moreover, it is needless to mention that for a cemented surface of a lens other than the lenses in the front lens unit, it is effective to apply the coating on the cemented surface based on a similar idea.

Figure 1B:
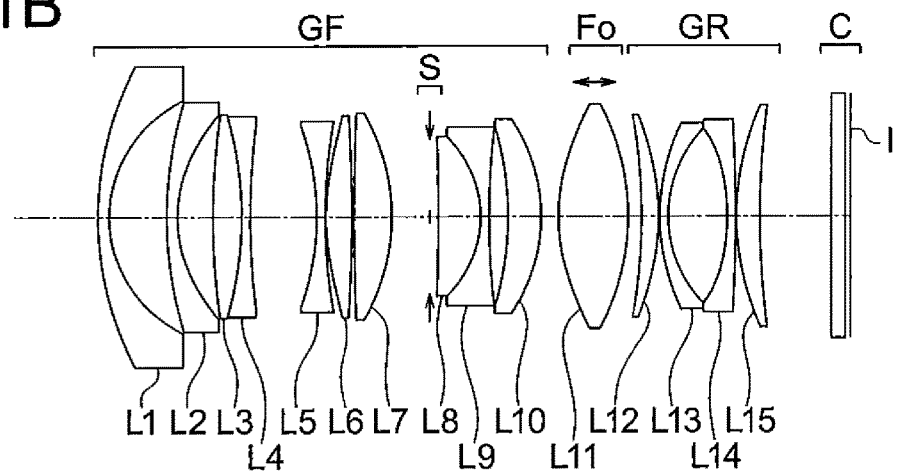
Figure 1C:
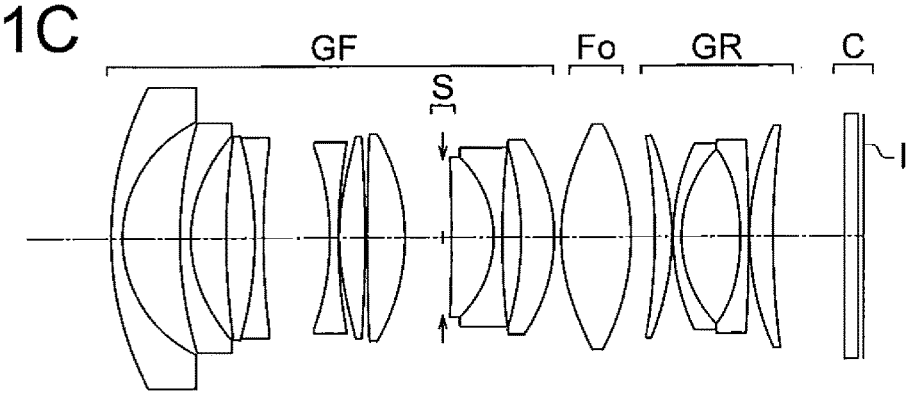

An image pickup lens according to the example 1 of the present invention, as shown in FIG. 1A, FIG. 1B, and FIG. 1C, includes in order from an object side to an image side, a front lens unit GF having a positive refractive power, a focusing lens Fo having a positive refractive power, and a rear lens unit GR having a negative refractive power. An aperture stop S is disposed in the front lens unit GF.

The front lens unit GF includes a negative meniscus lens L1 having a convex surface directed toward the object side, a negative meniscus lens L2 having a convex surface directed toward the object side, a biconvex positive lens L3, a biconcave negative lens L4, a biconcave negative lens L5, a biconvex positive lens L6, a biconvex positive lens L7, the aperture stop S, a positive meniscus lens L8 having a convex surface directed toward the image side, a biconcave negative lens L9, and a positive meniscus lens L10 having a convex surface directed toward the image side. The biconvex positive lens L3 and the biconcave negative lens L4 are cemented. Moreover, the positive meniscus lens L8 and the biconcave negative lens L9 are cemented.

The focusing lens Fo includes a biconvex positive lens L11.

The rear lens unit GR includes a positive meniscus lens L12 having a convex surface directed toward the object side, a negative meniscus lens L13 having a convex surface directed toward the object side, a negative meniscus lens L13 having a convex surface directed toward the image side, and a positive meniscus lens L15 having a convex surface directed toward the object side.

At the time of focusing, the focusing lens Fo moves along an optical axis. More elaborately, at the time of focusing from an object at infinity to a closest object, the focusing lens Fo moves toward the object side.

An aspheric surface is provided to a total of seven surfaces namely, an image-side surface of the negative meniscus lens L2, an object-side surface of the biconvex positive lens L6, both surfaces of the biconvex positive lens L11, both surfaces of the positive meniscus lens L12, and an object-side surface of the negative meniscus lens L14.

Figure 2A:
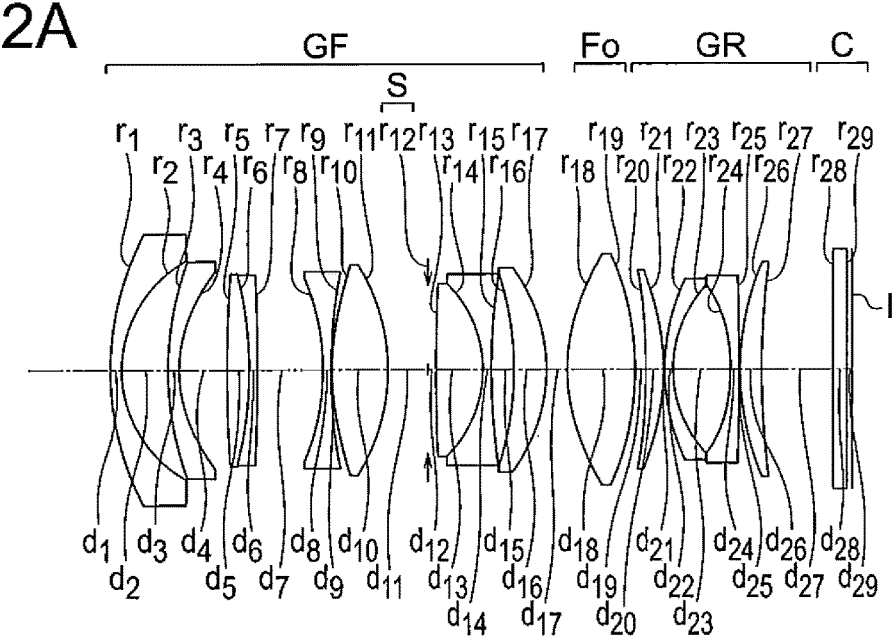
FIG. 2A, FIG. 2B, and FIG. 2C are lens cross-sectional views of an image pickup lens according to an example 2 of the present invention, where.
Figure 2B:
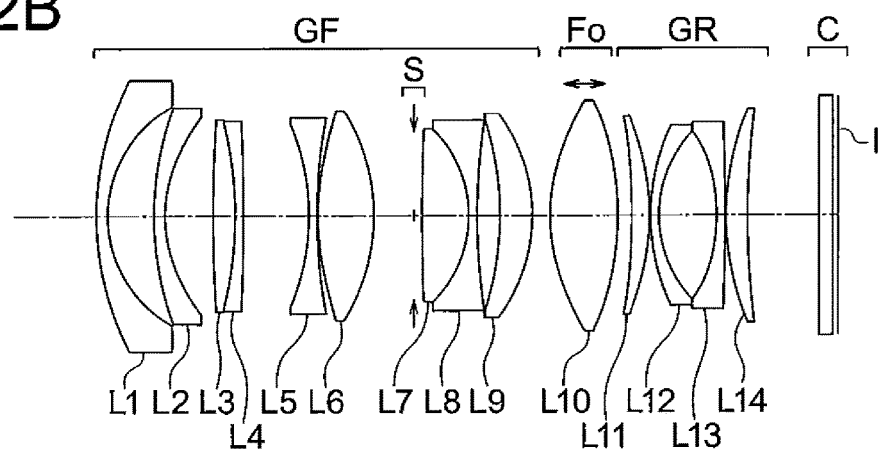
Figure 2C:
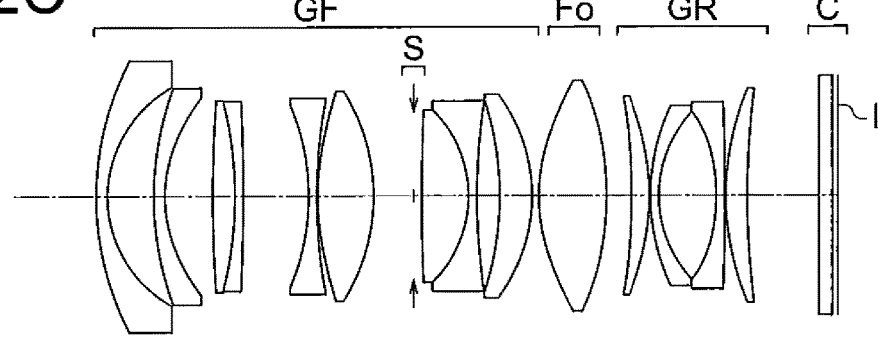

An image pickup lens according to the example 2 of the present invention, as shown in FIG. 2A, FIG. 2B, and FIG. 2C, includes in order from an object side to an image side, a front lens unit GF having a positive refractive power, a focusing lens Fo having a positive refractive power, and a rear lens unit GR having a negative refractive power. An aperture stop S is disposed in the front lens unit GF.

The front lens unit GF includes a negative meniscus lens L1 having a convex surface directed toward the object side, a negative meniscus lens L2 having a convex surface directed toward the object side, a biconvex positive lens L3, a negative meniscus lens L4 having a convex surface directed toward the image side, a biconcave negative lens L5, a biconvex positive lens L6, the aperture stop S, a biconvex positive lens L7, a biconcave negative lens L8, and a positive meniscus lens L9 having a convex surface directed toward the image side. The biconvex positive lens L3 and the negative meniscus lens L4 are cemented. Moreover, the biconvex positive lens L7 and the biconcave negative lens L8 are cemented.

The focusing lens Fo includes a biconvex positive lens L10.

The rear lens unit GR includes a positive meniscus lens L11 having a convex surface directed toward the image side, a negative meniscus lens L12 having a convex surface directed toward the object side, a negative meniscus lens L13 having a convex surface directed toward the image side, and a positive meniscus lens L14 having a convex surface directed toward the object side.

At the time of focusing, the focusing lens Fo moves along an optical axis. More elaborately, at the time of focusing from an object at infinity to a closest object, the focusing lens Fo moves toward the object side.

An aspheric surface is provided to a total of seven surfaces namely, an image-side surface of the negative meniscus lens L2, an object-side surface of the biconvex positive lens L6, both surfaces of the biconvex positive lens L10, both surfaces of the negative meniscus lens L11, and an object-side surface of the negative meniscus lens L13.

Figure 3A:
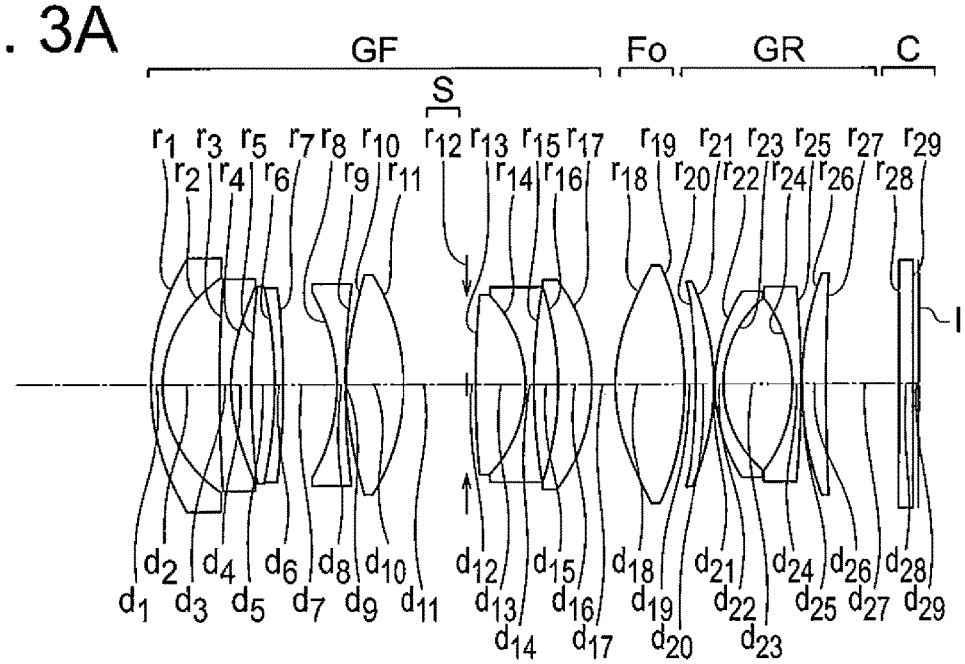
FIG. 3A, FIG. 3B, and FIG. 3C are lens cross-sectional views of an image pickup lens according to an example 3 of the present invention, where.
Figure 3B:
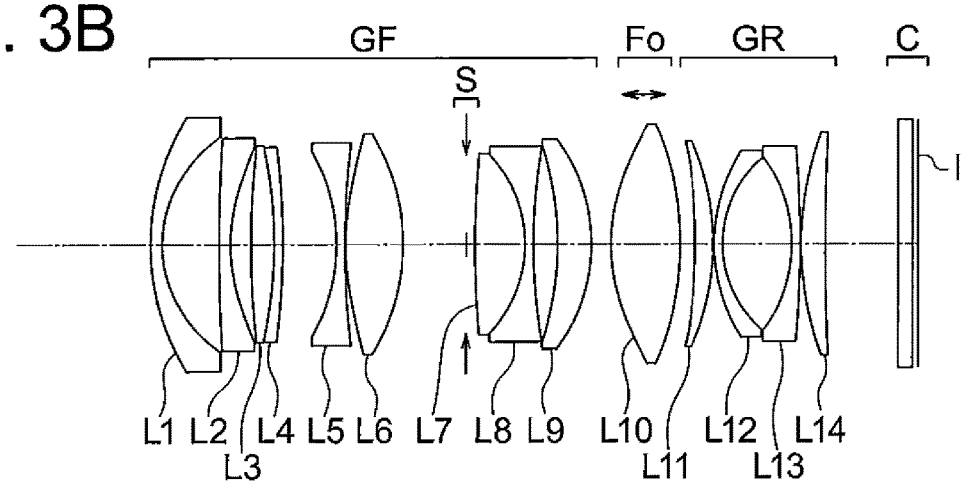
Figure 3C:
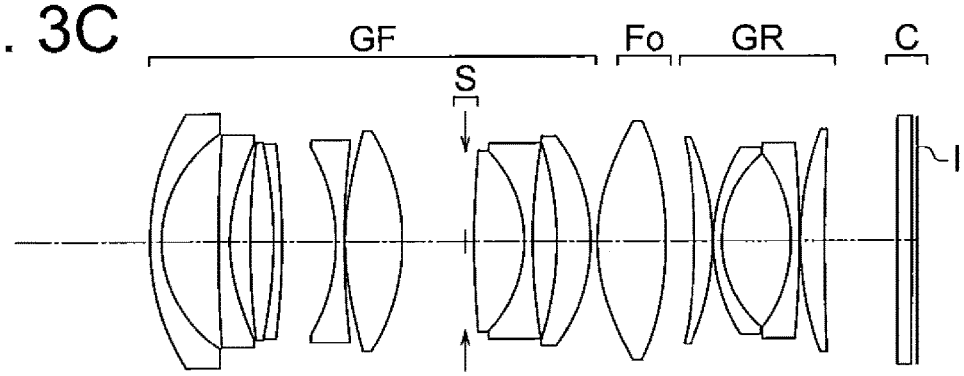

An image pickup lens according to the example 3 of the present invention, as shown in FIG. 3A, FIG. 3B, and FIG. 3C, includes in order from an object side to an image side, a front lens unit GF having a positive refractive power, a focusing lens Fo having a positive refractive power, and a rear lens unit GR having a negative refractive power. An aperture stop S is disposed in the front lens unit GF.

The front lens unit GF includes a negative meniscus lens L1 having a convex surface directed toward the object side, a negative meniscus lens L2 having a convex surface directed toward the object side, a biconvex positive lens L3, a negative meniscus lens L4 having a convex surface directed toward the image side, a biconcave negative lens L5, a biconvex positive lens L6, the aperture stop S, a biconvex positive lens L7, a biconcave negative lens L8, and a positive meniscus lens L9 having a convex surface directed toward the image side. The biconvex positive lens L3 and the negative meniscus lens L4 are cemented. Moreover, the biconvex positive lens L7 and the biconcave negative lens L8 are cemented.

The focusing lens Fo includes a biconvex positive lens L10.

The rear lens unit GR includes a positive meniscus lens L11 having a convex surface directed toward the image side, a negative meniscus lens L12 having a convex surface directed toward the object side, a negative meniscus lens L13 having a convex surface directed toward the image side, and a positive meniscus lens L14 having a convex surface directed toward the object side.

At the time of focusing, the focusing lens Fo moves along an optical axis. More elaborately, at the time of focusing from an object at infinity to a closest object, the focusing lens Fo moves toward the object side.

An aspheric surface is provided to a total of seven surfaces namely, an image-side surface of the negative meniscus lens L2, an object-side surface of the biconvex positive lens L6, both surfaces of the biconvex positive lens L10, both surfaces of the positive meniscus lens L11, and an object-side surface of the negative meniscus lens L13.

Figure 4A:
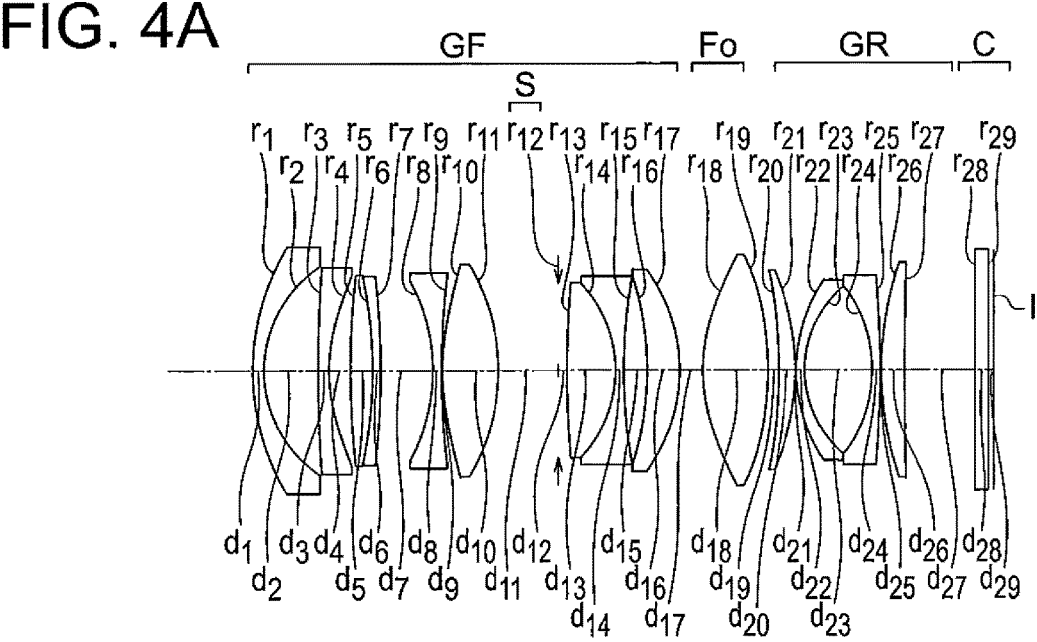
FIG. 4A, FIG. 4B, and FIG. 4C are lens cross-sectional views of an image pickup lens according to an example 4 of the present invention, where.
Figure 4B:
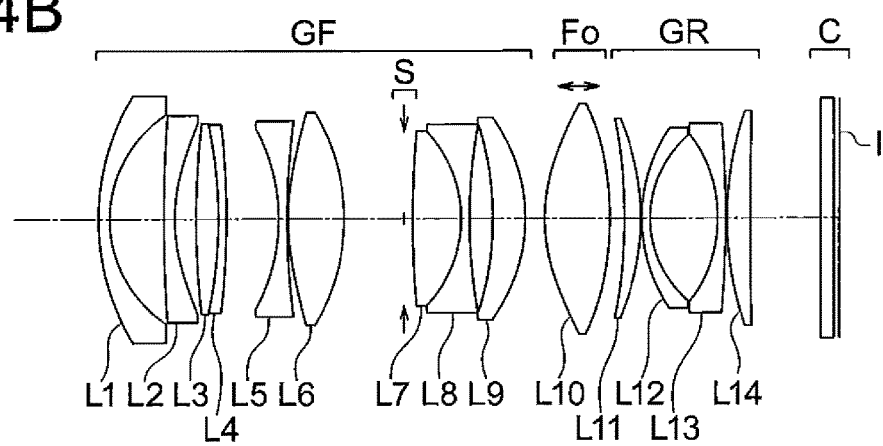
Figure 4C:
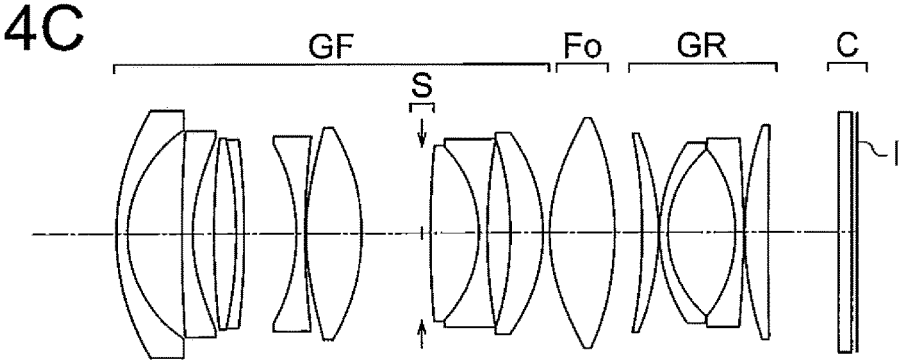

An image pickup lens according to the example 4 of the present invention, as shown in FIG. 4A, FIG. 4B, and FIG. 4C, includes in order from an object side to an image side, a front lens unit GF having a positive refractive power, a focusing lens Fo having a positive refractive power, and a rear lens unit GR having a negative refractive power. The aperture stop S is disposed in the front lens unit GF.

The front lens unit GF includes a negative meniscus lens L1 having a convex surface directed toward the object side, a negative meniscus lens L2 having a convex surface directed toward the object side, a biconvex positive lens L3, a negative meniscus lens L4 having a convex surface directed toward the image side, a biconcave negative lens L5, a biconvex positive lens L6, the aperture stop S, a biconvex positive lens L7, a biconcave negative lens L8, and a positive meniscus lens L9 having a convex surface directed toward the image side. The biconvex positive lens L3 and the negative meniscus lens L4 are cemented. Moreover, the biconvex positive lens L7 and the biconcave negative lens L8 are cemented.

The focusing lens Fo includes a biconvex positive lens L10.

The rear lens unit GR includes a positive meniscus lens L11 having a convex surface directed toward the image side, a negative meniscus lens L12 having a convex surface directed toward the object side, a negative meniscus lens L13 having a convex surface directed toward the image side, and a positive meniscus lens L14 having a convex surface directed toward the object side.

At the time of focusing, the focusing lens Fo moves along an optical axis. More elaborately, at the time of focusing from an object at infinity to a closest object, the focusing lens Fo moves toward the object side.

An aspheric surface is provided to a total of seven surfaces namely, an image-side surface of the negative meniscus lens L2, an object-side surface of the biconvex positive lens L6, both surfaces of the biconvex positive lens L10, both surface of the positive meniscus lens L11, and an object-side surface of the negative meniscus lens L13.

Figure 5A:
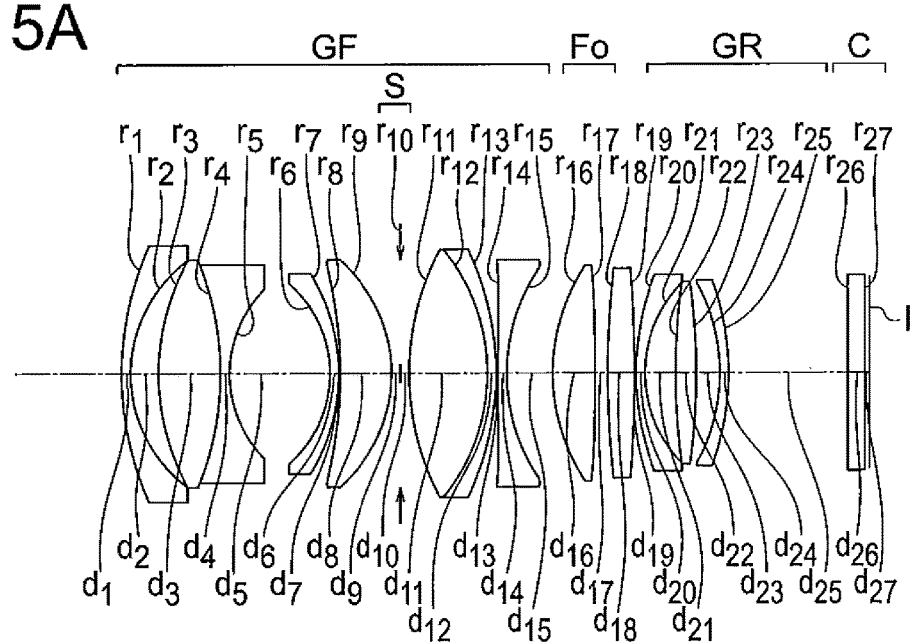
FIG. 5A, FIG. 5B, and FIG. 5C are lens cross-sectional views of an image pickup lens according to an example 5 of the present invention, where.
Figure 5B:
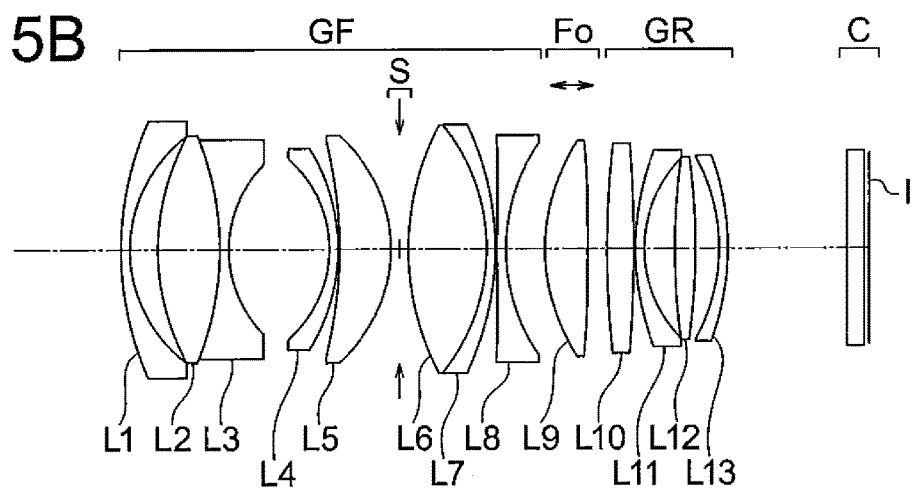
Figure 5C:
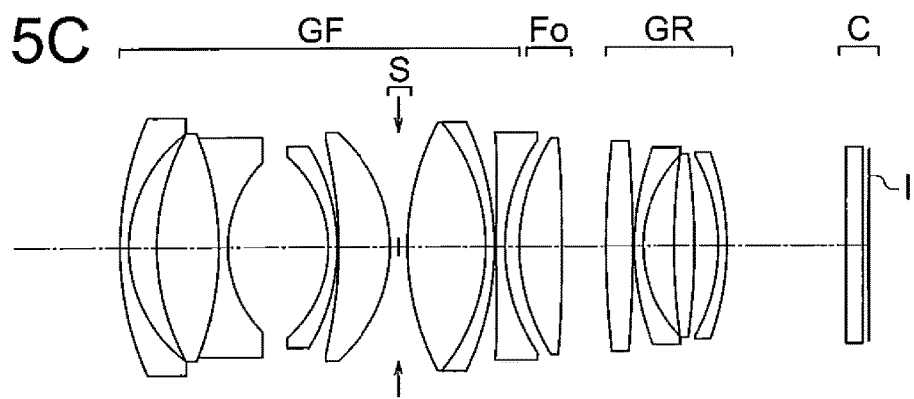

An image pickup lens according to the example 5 of the present invention, as shown in FIG. 5A, FIG. 5B, and FIG. 5C, includes in order from an object side to an image side, a front lens unit GF having a positive refractive power, a focusing lens Fo having a positive refractive power, and a rear lens unit GR having a negative refractive power. An aperture stop S is disposed in the front lens unit GF.

The front lens unit GF includes a negative meniscus lens L1 having a convex surface directed toward the object side, a biconvex positive lens L2, a biconcave negative lens L3, a negative meniscus lens L4 having a convex surface directed toward the image side, a positive meniscus lens L5 having a convex surface directed toward the image side, the aperture stop S, the biconvex positive lens L6, a negative meniscus lens L7 having a convex surface directed toward the image side, and a negative meniscus lens L8 having a convex surface directed toward the object side. The biconvex positive lens L2 and the biconcave negative lens L3 are cemented. Moreover, the biconvex positive lens L6 and the negative meniscus lens L7 are cemented.

The focusing lens Fo includes a biconvex positive lens L9.

The rear lens unit GR includes a biconvex positive lens L10, a negative meniscus lens L11 having a convex surface directed toward the object side, a biconvex positive lens L12, and a negative meniscus lens L13 having a convex surface directed toward the image side.

At the time of focusing, the focusing lens Fo moves along an optical axis. More elaborately, at the time of focusing from an object at infinity to a closest object, the focusing lens Fo moves toward the object side.

An aspheric surface is provided to a total of seven surfaces namely, an object-side surface of the biconvex positive lens L2, both surfaces of the positive meniscus lens L5, both surfaces of the negative meniscus lens L8, and both surfaces of the biconvex positive lens L9.

Figure 6A:
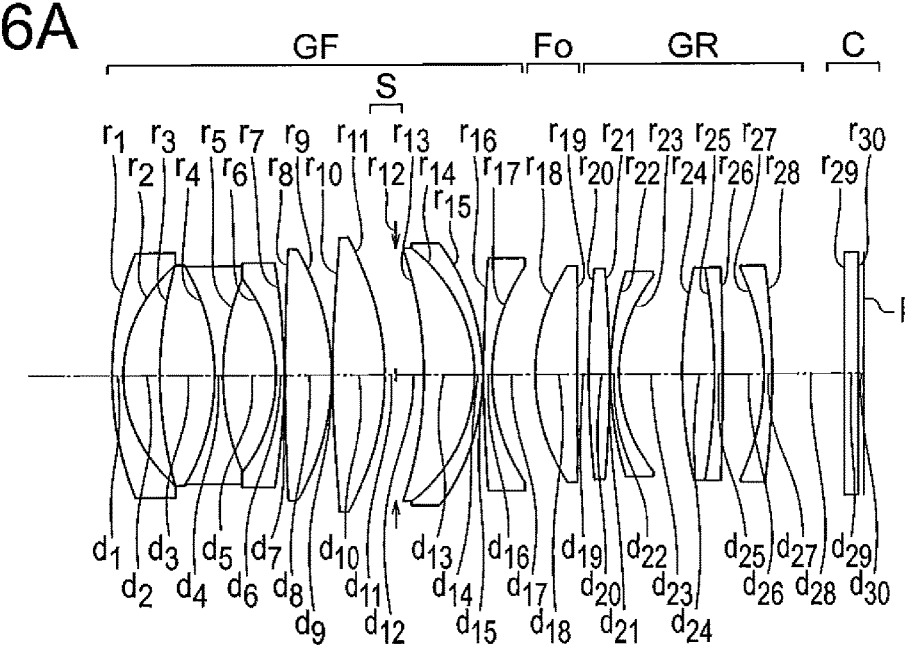
FIG. 6A, FIG. 6B, and FIG. 6C are lens cross-sectional views of an image pickup lens according to an example 6 of the present invention, where.
Figure 6B:
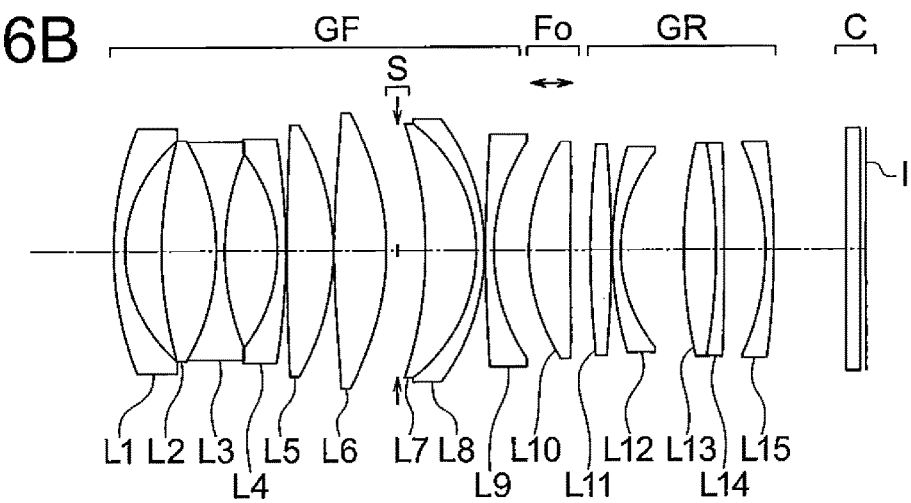
Figure 6C:
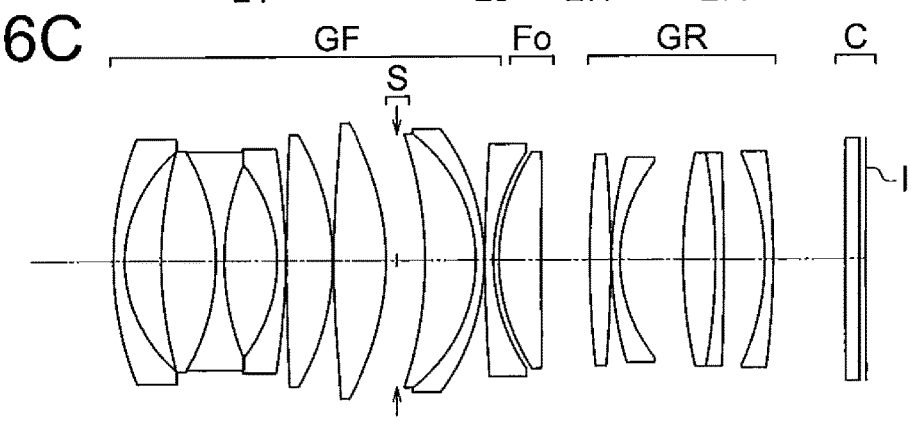

An image pickup lens according to the example 6 of the present invention, as shown in FIG. 6A, FIG. 6B, and FIG. 6C, includes in order from an object side to an image side, a front lens unit GF having a positive refractive power, a focusing lens Fo having a positive refractive power, and a rear lens unit GR having a negative refractive power. An aperture stop S is disposed in the front lens unit GF.

The front lens unit GF includes a negative meniscus lens L1 having a convex surface directed toward the object side, a biconvex positive lens L2, a biconcave negative lens L3, a negative meniscus lens L4 having a convex surface directed toward the image side, a biconvex positive lens L5, a biconvex positive lens L6, the aperture stop S, a positive meniscus lens L7 having a convex surface directed toward the image side, a negative meniscus lens L8 having a convex surface directed toward the image side, and a negative meniscus lens L9 having a convex surface directed toward the object side.

The focusing lens Fo includes a positive meniscus lens L10 having a convex surface directed toward the object side.

The rear lens unit GR includes a biconvex positive lens L11, a negative meniscus lens L12 having a convex surface directed toward the object side, a biconvex positive lens L13, a negative meniscus lens L14 having a convex surface directed toward the image side, and a negative meniscus lens L15 having a convex surface directed toward the image side.

At the time of focusing, the focusing lens Fo moves along an optical axis. More elaborately, at the time of focusing from an object at infinity to a closest object, the focusing lens Fo moves toward the object side.

An aspheric surface is provided to a total of seven surfaces namely, an object-side surface of the biconvex positive lens L2, both surfaces of the biconvex positive lens L6, both surfaces of the negative meniscus lens L9, and both surfaces of the positive meniscus lens L10.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, OD denotes an object distance, focal length denotes a focal length of the entire system, FNO. denotes an F number, ω denotes a half angle of view, IH denotes an image height, FB denotes a back focus, Lens total length is a distance from the frontmost lens surface to the rearmost lens surface plus back focus and each of f1, f2 . . . is a focal length of each lens unit. Further, FB is a unit which is expressed upon air conversion of a distance from the lens backmost surface to a paraxial image surface. Further, "0.03 magnification" denotes a state where it is focused at an object distance of which magnification is 0.03-power.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(k+1)(y/r)^2\}^{1/2}]+A_4y^4+A_6y^6+A_8y^8+A_{10}y^{10}$$

where, r denotes a paraxial radius of curvature, k denotes a conical coefficient, A4, A6, A8, and A10 denote aspherical surface coefficients of a fourth order, a sixth order, an eight order, and a tenth order respectively. Moreover, in the aspherical surface coefficients, e–n' (where, n is an integral number) indicates '$10^{-n}$'.

Example 1

| | | Unit mm | | |
|---|---|---|---|---|
| | | Surface data | | |
| Surface no. | r | d | nd | vd |
| Object plane | ∞ | ∞ | | |
| 1 | 59.575 | 2.00 | 1.48749 | 70.23 |
| 2 | 23.379 | 10.29 | | |
| 3 | 69.124 | 2.00 | 1.43700 | 95.10 |
| 4* | 23.655 | 6.30 | | |
| 5 | 132.142 | 5.16 | 1.92119 | 23.96 |
| 6 | −67.470 | 1.50 | 1.59282 | 68.63 |
| 7 | 135.429 | 11.89 | | |
| 8 | −49.057 | 1.50 | 1.85478 | 24.80 |
| 9 | 98.906 | 0.20 | | |
| 10* | 44.692 | 4.73 | 1.72903 | 54.04 |
| 11 | −290.424 | 0.40 | | |
| 12 | 441.015 | 6.77 | 1.88300 | 40.80 |
| 13 | −37.940 | 6.86 | | |
| 14(Stop) | ∞ | 1.50 | | |
| 15 | −434.533 | 7.58 | 1.49700 | 81.61 |
| 16 | −20.345 | 1.50 | 1.85478 | 24.80 |
| 17 | 142.167 | 3.40 | | |
| 18 | −58.386 | 5.87 | 1.94595 | 17.98 |
| 19 | −31.925 | Variable | | |
| 20* | 34.146 | 12.39 | 1.53071 | 55.69 |
| 21* | −42.385 | Variable | | |
| 22* | −97.356 | 3.03 | 1.43700 | 95.10 |
| 23* | −42.327 | 0.20 | | |
| 24 | 39.142 | 1.50 | 1.85478 | 24.80 |
| 25 | 23.246 | 10.54 | | |
| 26* | −40.795 | 1.50 | 1.63493 | 23.90 |
| 27 | −334.124 | 0.20 | | |
| 28 | 49.762 | 4.16 | 1.92119 | 23.96 |
| 29 | 154.193 | 12.96 | | |
| 30 | ∞ | 2.50 | 1.51633 | 64.14 |
| 31 | ∞ | 1.00 | | |
| Image plane | ∞ | | | |

Aspherical surface data

4th surface k = 0.000
A4 = −1.06007e−05, A6 = −5.13684e−09, A8 = −1.40909e−11

10th surface k = 0.000
A4 = −1.09299e−05, A6 = 6.94094e−09, A8 = −1.57038e−12

20th surface k = 0.000
A4 = −6.38321e−06, A6 = −1.98388e−09, A8 = −8.24194e−13

21th surface k = 0.000
A4 = 2.52998e−06, A6 = −7.21128e−09, A8 = 6.65254e−12

22th surface k = 0.000
A4 = 2.43954e−06, A6 = 3.15606e−09, A8 = −3.12737e−11

23th surface k = 0.000
A4 = 4.36025e−06, A6 = 1.26937e−08, A8 = −3.66550e−11

26th surface k = 0.000
A4 = −1.35451e−05, A6 = −4.65037e−09, A8 = −3.52020e−11

Various data

| OD | Infinity | 0.03 magnification | Close distande |
|---|---|---|---|
| f | 24.50 | 24.32 | 23.71 |
| FNO. | 1.47 | 1.47 | 1.44 |
| 2ω | 82.88 | 82.70 | 81.75 |
| IH | 21.633 | 21.633 | 21.633 |
| FB(in air) | 15.60 | 14.80 | 12.05 |
| Lens total length(in air) | 134.14 | 133.32 | 130.59 |
| d19 | 3.56 | 3.02 | 1.20 |
| d21 | 2.00 | 2.52 | 4.36 |

Unit focal length

| f1 = 189.12 | f2 = 37.75 | f3 = −109.35 |
|---|---|---|

Example 2

| | | Unit mm | | |
|---|---|---|---|---|
| | | Surface data | | |
| Surface no. | r | d | nd | vd |
| Object plane | ∞ | ∞ | | |
| 1 | 55.621 | 2.00 | 1.48749 | 70.23 |
| 2 | 23.290 | 8.41 | | |
| 3 | 58.530 | 2.00 | 1.43700 | 95.10 |
| 4* | 25.251 | 8.62 | | |
| 5 | 260.705 | 4.07 | 1.92119 | 23.96 |
| 6 | −71.360 | 1.50 | 1.59282 | 68.63 |
| 7 | −412.610 | 11.90 | | |
| 8 | −44.200 | 1.50 | 1.85478 | 24.80 |
| 9 | 96.270 | 0.20 | | |
| 10* | 46.511 | 10.28 | 1.86400 | 40.58 |
| 11 | −36.645 | 7.28 | | |
| 12(Stop) | ∞ | 1.50 | | |
| 13 | 348.583 | 8.61 | 1.49700 | 81.61 |
| 14 | −22.531 | 1.50 | 1.85478 | 24.80 |
| 15 | 120.618 | 4.11 | | |
| 16 | −58.386 | 5.87 | 1.94595 | 17.98 |
| 17 | −31.925 | Variable | | |
| 18* | 32.797 | 12.32 | 1.53071 | 55.69 |
| 19* | −55.310 | Variable | | |
| 20* | −117.622 | 3.25 | 1.43700 | 95.10 |
| 21* | −44.727 | 0.20 | | |
| 22 | 39.517 | 1.50 | 1.85478 | 24.80 |
| 23 | 22.768 | 10.48 | | |
| 24* | −38.744 | 1.50 | 1.63493 | 23.90 |
| 25 | −523.512 | 0.20 | | |
| 26 | 50.661 | 3.96 | 1.92119 | 23.96 |
| 27 | 156.766 | 12.96 | | |
| 28 | ∞ | 2.50 | 1.51633 | 64.14 |
| 29 | ∞ | 1.00 | | |
| Image plane | ∞ | | | |

-continued

Unit mm

Aspherical surface data

4th surface k = 0.000
A4 = −8.84326e−06, A6 = −4.08863e−09, A8 = −1.21868e−11

10th surface k = 0.000
A4 = −8.07548e−06, A6 = 3.68257e−09, A8 = −6.38790e−13

18th surface k = 0.000
A4 = −5.99428e−06, A6 = −3.30440e−09, A8 = −5.72177e−13

19th surface k = 0.000
A4 = 6.92125e−07, A6 = −6.28603e−09, A8 = 5.79720e−12

20th surface k = 0.000
A4 = 1.31122e−06, A6 = −3.79776e−09, A8 = −8.97321e−12

21th surface k = 0.000
A4 = 1.43376e−06, A6 = 7.86969e−09, A8 = −1.68908e−11

24th surface k = 0.000
A4 = −1.61088e−05, A6 = −2.42242e−09, A8 = −4.70658e−11

Various data

| OD | Infinity | 0.03 magnification | Close distande |
|---|---|---|---|
| f | 28.60 | 28.29 | 27.25 |
| FNO. | 1.45 | 1.44 | 1.39 |
| 2ω | 72.05 | 71.93 | 71.23 |
| IH | 21.633 | 21.633 | 21.633 |
| FB(in air) | 15.60 | 14.67 | 11.52 |
| Lens total length(in air) | 134.14 | 133.20 | 130.06 |
| d17 | 3.77 | 3.19 | 1.20 |
| d19 | 2.00 | 2.57 | 4.57 |

Unit focal length

| f1 = 126.65 | f2 = 40.77 | f3 = −84.70 |
|---|---|---|

Example 3

Unit mm

Surface data

| Surface no. | r | d | nd | vd |
|---|---|---|---|---|
| Object plane | ∞ | ∞ | | |
| 1 | 22.998 | 1.03 | 1.48749 | 70.23 |
| 2 | 11.895 | 5.12 | | |
| 3 | 163.222 | 1.03 | 1.43700 | 95.10 |
| 4* | 16.195 | 1.80 | | |
| 5 | 77.676 | 2.14 | 1.92119 | 23.96 |
| 6 | −42.460 | 0.77 | 1.59282 | 68.63 |
| 7 | −74.286 | 4.87 | | |
| 8 | −17.253 | 0.77 | 1.85478 | 24.80 |
| 9 | 72.825 | 0.10 | | |
| 10* | 23.805 | 5.27 | 1.86400 | 40.58 |
| 11 | −19.360 | 5.73 | | |
| 12(Stop) | ∞ | 0.77 | | |
| 13 | 95.001 | 4.54 | 1.49700 | 81.61 |
| 14 | −12.136 | 0.77 | 1.85478 | 24.80 |
| 15 | 52.810 | 2.20 | | |
| 16 | −30.093 | 3.03 | 1.94595 | 17.98 |
| 17 | −16.455 | Variable | | |
| 18* | 16.732 | 6.22 | 1.53071 | 55.69 |
| 19* | −31.667 | Variable | | |
| 20* | −60.227 | 1.62 | 1.43700 | 95.10 |
| 21* | −23.596 | 0.10 | | |
| 22 | 16.231 | 0.77 | 1.85478 | 24.80 |
| 23 | 10.709 | 6.19 | | |
| 24* | −14.673 | 0.77 | 1.63493 | 23.90 |
| 25 | −105.042 | 0.10 | | |
| 26 | 29.981 | 2.17 | 1.92119 | 23.96 |
| 27 | 202.084 | 6.68 | | |
| 28 | ∞ | 1.29 | 1.51633 | 64.14 |
| 29 | ∞ | 0.52 | | |
| Image plane | ∞ | | | |

Aspherical surface data

4th surface k = 0.000
A4 = −8.34093e−05, A6 = −6.20387e−08, A8 = −4.23301e−10

10th surface k = 0.000
A4 = −7.04870e−05, A6 = 1.40262e−07, A8 = −1.76556e−10

18th surface k = 0.000
A4 = −4.55007e−05, A6 = −1.11937e−07, A8 = −4.02141e−11

19th surface k = 0.000
A4 = −6.38745e−06, A6 = −1.48035e−07, A8 = 4.93907e−10

20th surface k = 0.000
A4 = 1.36359e−06, A6 = −1.67564e−07, A8 = −6.88791e−10

21th surface k = 0.000
A4 = 1.42209e−07, A6 = 1.80304e−07, A8 = −1.51942e−09

24th surface k = 0.000
A4 = −6.55334e−05, A6 = 1.81340e−07, A8 = −2.73155e−09

Various data

| OD | Infinity | 0.03 magnification | Close distande |
|---|---|---|---|
| f | 17.68 | 17.44 | 16.67 |
| FNO. | 1.48 | 1.47 | 1.41 |
| 2ω | 62.47 | 62.32 | 61.49 |
| IH | 11.150 | 11.150 | 11.150 |
| FB(in air) | 8.04 | 7.47 | 5.54 |
| Lens total length(in air) | 69.14 | 68.55 | 66.64 |
| d17 | 2.16 | 1.81 | 0.62 |
| d19 | 1.03 | 1.37 | 2.57 |

Unit focal length

| f1 = 86.06 | f2 = 21.59 | f3 = −40.62 |
|---|---|---|

Example 4

Unit mm

Surface data

| Surface no. | r | d | nd | vd |
|---|---|---|---|---|
| Object plane | ∞ | ∞ | | |
| 1 | 44.842 | 2.00 | 1.48749 | 70.23 |
| 2 | 23.123 | 9.89 | | |
| 3 | 275.962 | 2.00 | 1.43700 | 95.10 |

-continued

Unit mm

| | | | | |
|---|---|---|---|---|
| 4* | 31.624 | 3.86 | | |
| 5 | 155.242 | 4.10 | 1.92119 | 23.96 |
| 6 | −82.944 | 1.50 | 1.59282 | 68.63 |
| 7 | −148.594 | 9.53 | | |
| 8 | −34.032 | 1.50 | 1.85478 | 24.80 |
| 9 | 145.734 | 0.20 | | |
| 10* | 46.271 | 10.20 | 1.86400 | 40.58 |
| 11 | −38.110 | 11.03 | | |
| 12(Stop) | ∞ | 1.50 | | |
| 13 | 194.162 | 8.83 | 1.49700 | 81.61 |
| 14 | −23.318 | 1.50 | 1.85478 | 24.80 |
| 15 | 101.786 | 4.15 | | |
| 16 | −58.386 | 5.87 | 1.94595 | 17.98 |
| 17* | −31.925 | Variable | | |
| 18* | 32.251 | 11.75 | 1.53071 | 55.69 |
| 19* | −61.461 | Variable | | |
| 20* | −104.744 | 3.05 | 1.43700 | 95.10 |
| 21* | −44.736 | 0.20 | | |
| 22 | 30.278 | 1.50 | 1.85478 | 24.80 |
| 23 | 20.460 | 12.25 | | |
| 24* | −27.451 | 1.50 | 1.63493 | 23.90 |
| 25 | −192.861 | 0.20 | | |
| 26 | 61.971 | 4.23 | 1.92119 | 23.96 |
| 27 | 928.539 | 12.96 | | |
| 28 | ∞ | 2.50 | 1.51633 | 64.14 |
| 29 | ∞ | 1.00 | | |
| Image plane | ∞ | | | |

Aspherical surface data

4th surface k = 0.000
A4 = −1.11571e−05, A6 = −2.28330e−09, A8 = −4.32715e−12
10th surface k = 0.000
A4 = −9.41858e−06, A6 = 4.81133e−09, A8 = −1.51374e−12
18th surface k = 0.000
A4 = −6.37201e−06, A6 = −4.40592e−09, A8 = −4.25233e−13
19th surface k = 0.000
A4 = −1.14309e−06, A6 = −5.21476e−09, A8 = 4.47848e−12
20th surface k = 0.000
A4 = 7.40261e−07, A6 = −5.59363e−09, A8 = −4.63037e−12
21th surface k = 0.000
A4 = 6.57957e−07, A6 = 6.67078e−09, A8 = −1.25454e−11
24th surface k = 0.000
A4 = −8.37421e−06, A6 = 8.40465e−09, A8 = −2.85295e−11

Various data

| OD | Infinity | 0.03 magnification | Close distande |
|---|---|---|---|
| f | 34.30 | 33.85 | 32.36 |
| FNO. | 1.48 | 1.47 | 1.41 |
| 2ω | 62.47 | 62.32 | 61.45 |
| IH | 21.633 | 21.633 | 21.633 |
| FB(in air) | 15.60 | 14.49 | 10.75 |
| Lens total length(in air) | 134.14 | 133.01 | 129.29 |
| d17 | 4.19 | 3.50 | 1.20 |
| d19 | 2.00 | 2.66 | 4.99 |

Unit focal length

| | | |
|---|---|---|
| f1 = 172.64 | f2 = 41.67 | f3 = −79.29 |

Example 5

Unit mm

Surface data

| Surface no. | r | d | nd | vd |
|---|---|---|---|---|
| Object plane | ∞ | ∞ | | |
| 1 | 37.020 | 1.00 | 1.48749 | 70.23 |
| 2 | 16.482 | 3.18 | | |
| 3* | 26.739 | 7.00 | 1.90270 | 31.00 |
| 4 | −35.394 | 1.00 | 1.64769 | 33.79 |
| 5 | 14.054 | 11.40 | | |
| 6 | −13.956 | 1.00 | 1.85025 | 30.05 |
| 7 | −22.238 | 0.20 | | |
| 8* | −45.704 | 5.87 | 1.58313 | 59.38 |
| 9* | −17.089 | 1.00 | | |
| 10(Stop) | ∞ | 1.00 | | |
| 11 | 30.788 | 9.04 | 1.59522 | 67.74 |
| 12 | −22.492 | 1.00 | 1.85025 | 30.05 |
| 13 | −32.851 | 0.20 | | |
| 14* | 330.238 | 1.00 | 1.53071 | 55.69 |
| 15* | 23.483 | Variable | | |
| 16* | 22.646 | 4.76 | 1.53071 | 55.69 |
| 17* | −535.370 | Variable | | |
| 18 | 114.859 | 3.00 | 1.74320 | 49.34 |
| 19 | −166.459 | 0.20 | | |
| 20 | 31.695 | 1.00 | 1.68893 | 31.07 |
| 21 | 14.971 | 3.51 | | |
| 22 | 78.208 | 2.32 | 1.80400 | 46.57 |
| 23 | −79.338 | 2.70 | | |
| 24 | −21.784 | 1.00 | 1.68893 | 31.07 |
| 25 | −31.308 | 13.50 | | |
| 26 | ∞ | 2.00 | 1.51633 | 64.14 |
| 27 | ∞ | 0.50 | | |
| Image plane | ∞ | | | |

Aspherical surface data

3rd surface k = 0.000
A4 = −3.57574e−06, A6 = −7.57764e−09, A8 = 7.98133e−12
8th surface k = 0.000
A4 = 7.40922e−06, A6 = 4.73722e−09
9th surface k = 0.000
A4 = 1.58406e−06, A6 = 2.70273e−08, A8 = 2.01202e−11
14th surface k = 0.000
A4 = −9.59358e−06, A6 = −2.37979e−08
15th surface k = 0.000
A4 = 1.72790e−05, A6 = −4.76454e−08, A8 = 5.31156e−11
16th surface k = 0.000
A4 = −1.02055e−06, A6 = −3.06189e−08
17th surface k = 0.000
A4 = −1.43982e−05, A6 = 2.14247e−08

Various data

| OD | Infinity | 0.03 magnification | Close distande |
|---|---|---|---|
| f | 24.49 | 24.36 | 23.88 |
| FNO. | 1.43 | 1.42 | 1.40 |
| 2ω | 48.11 | 47.46 | 45.06 |
| IH | 10.815 | 10.815 | 10.815 |
| FB(in air) | 15.32 | 14.59 | 11.92 |
| Lens total length(in air) | 84.31 | 83.58 | 80.91 |

-continued

Unit mm

| | | | |
|---|---|---|---|
| d15 | 5.15 | 4.39 | 1.60 |
| d17 | 1.45 | 2.21 | 5.00 |

Unit focal length

| | | |
|---|---|---|
| f1 = 91.13 | f2 = 41.06 | f3 = −1304.06 |

Example 6

Unit mm

Surface data

| Surface no. | r | d | nd | vd |
|---|---|---|---|---|
| Object plane | ∞ | ∞ | | |
| 1 | 62.403 | 2.00 | 1.48749 | 70.23 |
| 2 | 26.375 | 6.44 | | |
| 3* | 69.523 | 9.73 | 1.90270 | 31.00 |
| 4 | −40.415 | 1.50 | 1.64769 | 33.79 |
| 5 | 45.894 | 9.49 | | |
| 6 | −28.902 | 1.50 | 1.85025 | 30.05 |
| 7 | −125.558 | 0.20 | | |
| 8 | 464.820 | 8.41 | 1.64000 | 60.08 |
| 9 | −45.289 | 0.20 | | |
| 10* | 174.291 | 9.52 | 1.76802 | 49.24 |
| 11* | −47.045 | 2.00 | | |
| 12(Stop) | ∞ | 5.07 | | |
| 13 | −72.649 | 9.09 | 1.59522 | 67.74 |
| 14 | −29.200 | 1.50 | 1.85025 | 30.05 |
| 15 | −40.583 | 0.20 | | |
| 16* | 258.933 | 1.50 | 1.53071 | 55.69 |
| 17* | 36.994 | Variable | | |
| 18* | 35.212 | 7.52 | 1.53071 | 55.69 |
| 19* | 476.165 | Variable | | |
| 20 | 181.025 | 3.77 | 1.49700 | 81.61 |
| 21 | −231.435 | 0.20 | | |
| 22 | 66.257 | 1.50 | 1.68893 | 31.07 |
| 23 | 28.644 | 11.34 | | |
| 24 | 90.928 | 5.69 | 1.95375 | 32.32 |
| 25 | −110.768 | 1.50 | 1.71736 | 29.52 |
| 26 | −531.786 | 7.39 | | |
| 27 | −45.755 | 1.50 | 1.68893 | 31.07 |
| 28 | −150.687 | 13.06 | | |
| 29 | ∞ | 2.50 | 1.51633 | 64.14 |
| 30 | ∞ | 1.00 | | |
| Image plane | ∞ | | | |

Aspherical surface data

3rd surface

A4 = 0.000
A4 = −9.83703e−07, A6 = −7.01762e−10, A8 = 3.48327e−13
10th surface k = 0.000
A4 = −1.27462e−06, A6 = −2.08875e−10
11th surface k = 0.000
A4 = 1.59973e−06, A6 = 4.23743e−10, A8 = −7.25460e−13
16th surface k = 0.000
A4 = −5.36285e−07, A6 = 4.89507e−11
17th surface k = 0.000
A4 = 1.97279e−06, A6 = −2.83623e−09, A8 = 5.23346e−13

-continued

Unit mm

18th surface k = 0.000
A4 = −4.43462e−07, A6 = −2.30233e−09
19th surface k = 0.000
A4 = −3.28438e−06, A6 = 2.01483e−09

Various data

| OD | Infinity | 0.03 magnification | Close distande |
|---|---|---|---|
| f | 49.00 | 48.39 | 46.32 |
| FNO. | 1.42 | 1.40 | 1.34 |
| 2ω | 47.88 | 47.10 | 44.26 |
| IH | 21.633 | 21.633 | 21.633 |
| FB(in air) | 15.71 | 14.19 | 8.97 |
| Lens total length(in air) | 134.14 | 132.61 | 127.39 |
| d17 | 7.66 | 6.18 | 1.00 |
| d19 | 2.00 | 3.48 | 8.66 |

Unit focal length

| | | |
|---|---|---|
| f1 = 133.68 | f2 = 71.22 | f3 = −253.01 |

Aberration diagrams of the examples from the example 1 to the example 6 are shown in FIG. 7A to FIG. 12L. In each diagram, ω denotes a half angle of view.

In the aberration diagrams, FIG. 7A, FIG. 7B, FIG. 7C, FIG. 7D, FIG. 8A, FIG. 8B, FIG. 8C, FIG. 8D, FIG. 9A, FIG. 9B, FIG. 9C, FIG. 9D, FIG. 10A, FIG. 10B, FIG. 10C, FIG. 10D, FIG. 11A, FIG. 11B, FIG. 11C, FIG. 11D, FIG. 12A, FIG. 12B, FIG. 12C, and FIG. 12D show a spherical aberration (SA), an astigmatism (AS), a distortion (DT), and a chromatic aberration of magnification (CC) respectively, at the time of focusing to an object at infinity.

Moreover, FIG. 7E, FIG. 7F, FIG. 7G, FIG. 7H, FIG. 8E, FIG. 8F, FIG. 8G, FIG. 8H, FIG. 9E, FIG. 9F, FIG. 9G, FIG. 9H, FIG. 10E, FIG. 10F, FIG. 10G, FIG. 10H, FIG. 11E, FIG. 11F, FIG. 11G, FIG. 11H, FIG. 12E, FIG. 12F, FIGS. 12G, and 12H show a spherical aberration (SA), an astigmatism, a distortion (DT), and a chromatic aberration of magnification (CC) respectively, when the magnification is 0.03 times.

Furthermore, FIG. 7I, FIG. 7J, FIG. 7K, FIG. 7L, FIG. 8I, 8J, FIG. 8K, FIG. 8L, FIG. 9I, FIG. 9J, FIG. 9K, FIG. 9L, FIG. 10I, FIG. 10J, FIG. 10K, FIG. 10L, FIG. 11I, FIG. 11J, FIG. 11K, FIG. 11L, FIG. 12I, FIG. 12J, FIG. 12K, and FIG. 12L show a spherical aberration (SA), an astigmatism (AS), a distortion (DT), and a chromatic aberration of magnification (CC) respectively, at the time of focusing to a closest object.

Next, the Values of conditional expressions (1)-(6) in each of the examples are shown below.

| Conditional expression | Example1 | Example2 | Example3 |
|---|---|---|---|
| (1) $f_f/f_{fo}$ | 5.01 | 3.11 | 3.99 |
| (2) $f_{r1}/f_{fo}$ | 4.46 | 4 | 4.06 |
| (3) $(1 - mg_{Fo}^2) \times (mg_R)^2$ | 1.25 | 1.16 | 1.24 |
| (4) $v_{dFo}$ | 55.69 | 55.69 | 55.69 |
| (5) $(r_{Rfof} + r_{Rfor})/(r_{Rfof} - r_{Rfor})$ | −0.11 | −0.26 | −0.31 |
| (6) $Fno/(f \times 21.633/Y)$ | 0.06 | 0.051 | 0.043 |

| Conditional expression | Example4 | Example5 | Example6 |
|---|---|---|---|
| (1) $f_f/f_{fo}$ | 4.14 | 2.22 | 1.88 |
| (2) $f_{r1}/f_{fo}$ | 4.22 | 2.24 | 2.88 |

| | | | |
|---|---|---|---|
| (3) $(1 - mg_{Fo}^2) \times (mg_R)^2$ | 1.26 | 0.56 | 0.51 |
| (4) $v_{dFo}$ | 55.69 | 55.69 | 55.69 |
| (5) $(r_{Rfof} + r_{Rfor})/(r_{Rfof} - r_{Rfor})$ | −0.31 | −0.92 | −1.16 |
| (6) $Fno/(f \times 21.633/Y)$ | 0.043 | 0.029 | 0.029 |

Figure 13:
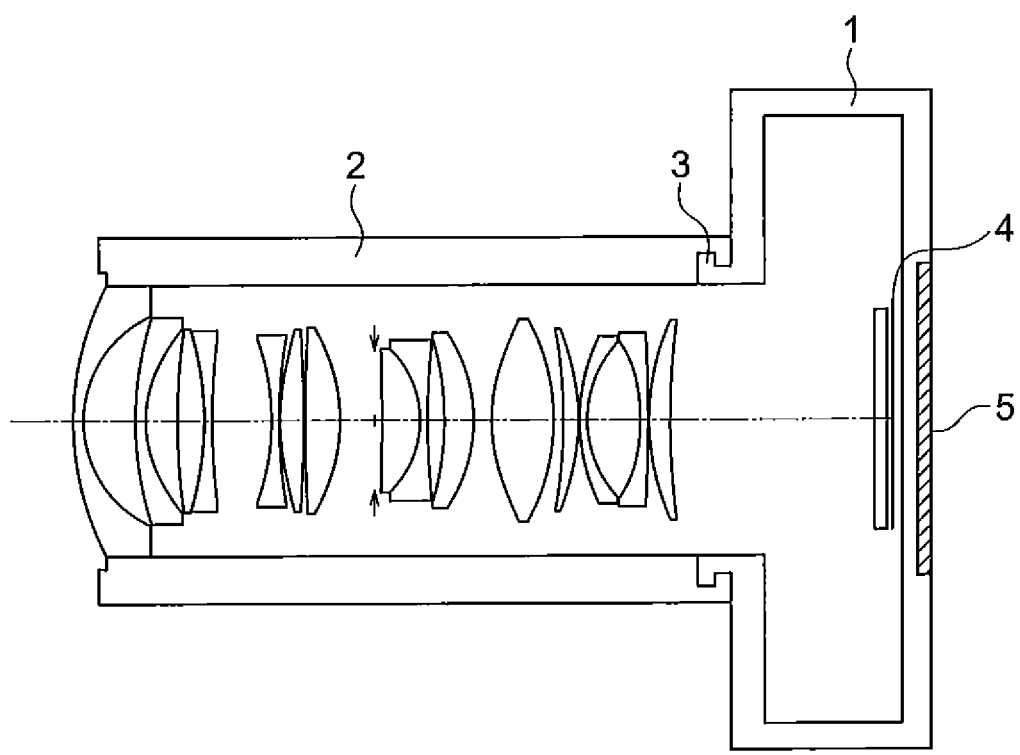
FIG. 13 is a cross-sectional view of an image pickup apparatus.

FIG. 13 is a cross-sectional view of a single-lens mirrorless camera as an electronic image pickup apparatus. In FIG. 13, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the reflecting telescope optical system according to the present invention described in any one of the examples from the first example to the sixth example is to be used. A moving mechanism member 6 for moving the focusing lens unit Lf and a moving mechanism member 7 for moving the wobbling lens unit Lw are disposed inside the lens barrel.

Figure 14:
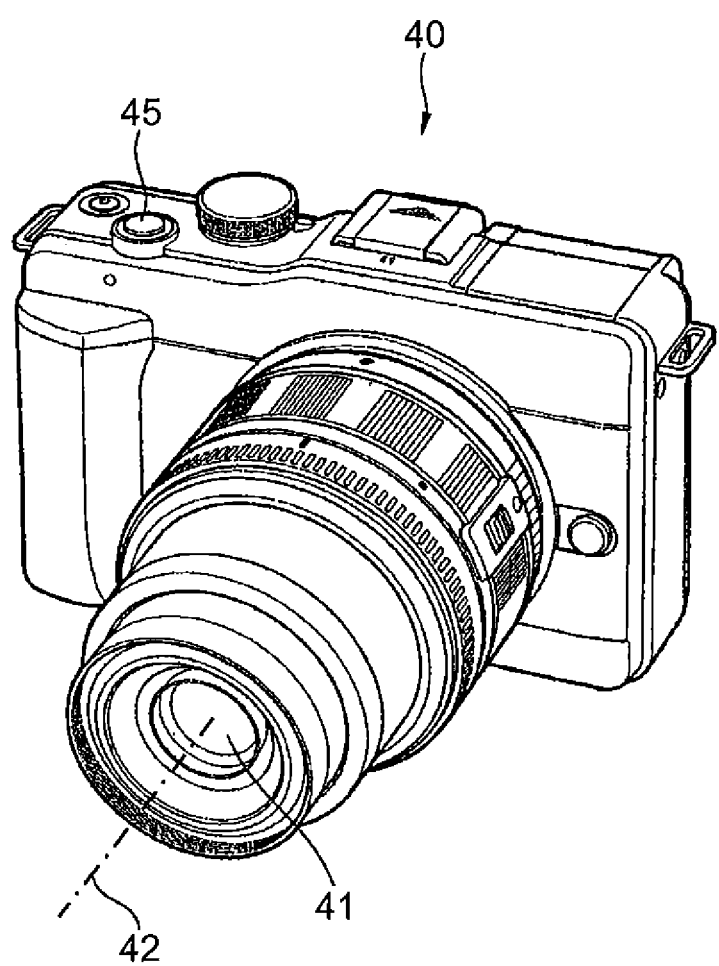
FIG. 14 is a front perspective view showing an appearance of the image pickup apparatus.
Figure 15:
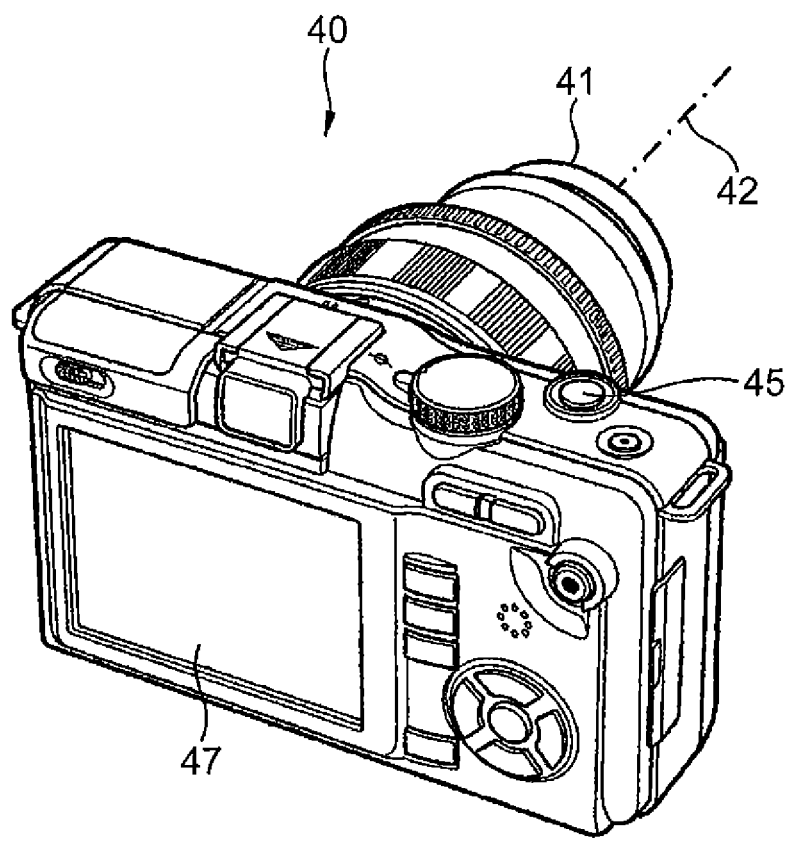
FIG. 15 is a rear perspective view of the image pickup apparatus.

FIG. 14 and FIG. 15 are conceptual diagrams of an arrangement of the image pickup apparatus according to the present invention. FIG. 14 is a front perspective view showing an appearance of a digital camera 40 as the image pickup apparatus, and FIG. 15 is a rear perspective view of the digital camera 40. The reflecting telescope optical system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the reflecting telescope optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 16 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 16, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 140 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The digital camera 40 arranged in such manner, can be used as an image pickup apparatus which is capable of capturing promptly a wide range with high resolution by using the image pickup lens of the present invention as a photographic optical system 41.

As mentioned heretofore, the present invention is suitable for a small-size image pickup lens in which, various aberrations are reduced sufficiently while having a large aperture diameter, and the focusing lens has been light-weighted, and an image pickup apparatus and a digital equipment having the image pickup lens.

According to the present invention, it is possible to provide a small-size image pickup lens in which, various aberrations are reduced sufficiently while having a large aperture diameter, and the focusing lens has been light-weighted.

What is claimed is:

1. An image pickup lens comprising in order from an object side:
    a front lens unit having a positive refractive power;
    a single focusing lens having a positive refractive power; and
    a rear lens unit having a negative refractive power, wherein
    at the time of focusing, only the single focusing lens moves on an optical axis, and
    a single lens having a positive refractive power is disposed nearest to an object in the rear lens unit,
    wherein the image pickup lens satisfies the following conditional expression (2)

$$1.0 < f_{r1}/f_{fo} \leq 4.46 \tag{2}$$

where,
$f_{r1}$ denotes a focal length of the single lens having a positive refractive power which is disposed nearest to an object in the rear lens unit, and
$f_{fo}$ denotes a focal length of the single focusing lens.

2. The image pickup lens according to claim 1, wherein the image pickup lens satisfies the following conditional expression (1)

$$1.0 < f_f/f_{fo} \tag{1}$$

where,
$f_f$ denotes a focal length of the front lens unit, and
$f_{fo}$ denotes a focal length of the single focusing lens.

3. The image pickup lens according to claim 1, wherein the image pickup lens satisfies the following conditional expression (3)

$$0.5 < (1 - mg_{Fo}^2) \times (mg_R)^2 \tag{3}$$

where,
$mg_{Fo}$ denotes a lateral magnification of the single focusing lens, and
$mg_R$ denotes a lateral magnification of the rear lens unit.

4. The image pickup lens according to claim 1, wherein the image pickup lens satisfies the following conditional expression (4)

$$v_{dFo} \geq 40.0 \tag{4}$$

where,
$v_{dFo}$ denotes Abbe's number for the single focusing lens.

5. The image pickup lens according to claim 1, wherein the image pickup lens satisfies the following conditional expression (5)

$$(r_{Rfof} + r_{Rfor})/(r_{Rfof} - r_{Rfor}) < 0.0 \tag{5}$$

where,
$r_{Rfof}$ denotes a radius of curvature of an object-side surface of the single focusing lens, and
$r_{Rfor}$ denotes a radius of curvature of an image-side surface of the single focusing lens.

6. The image pickup lens according to claim 1, wherein the image pickup lens satisfies the following conditional expression (6)

$$0.0 < Fno/(f \times 21.633/Y) < 0.08 \tag{6}$$

where,
f denotes a focal length of the overall lens system,
Fno denotes an F-number of the overall lens system, and
Y denotes a maximum image height on image forming surface of the lens.

* * * * *